United States Patent [19]
Scantlin

[11] Patent Number: 5,574,927
[45] Date of Patent: Nov. 12, 1996

[54] RISC ARCHITECTURE COMPUTER CONFIGURED FOR EMULATION OF THE INSTRUCTION SET OF A TARGET COMPUTER

[75] Inventor: Henry L. Scantlin, Hermosa Beach, Calif.

[73] Assignee: International Meta Systems, Inc., El Segundo, Calif.

[21] Appl. No.: 218,225

[22] Filed: Mar. 25, 1994

[51] Int. Cl.$^6$ .............................. G06F 9/30; G06F 9/312; G06F 9/315; G06F 9/318
[52] U.S. Cl. .................. 395/800; 395/500; 395/376; 364/DIG. 1; 364/232.72; 364/259.7; 364/259.9
[58] Field of Search ..................................... 395/375, 500, 395/800

[56] References Cited

U.S. PATENT DOCUMENTS

| | | | |
|---|---|---|---|
| 4,992,934 | 2/1991 | Portanova et al. | 395/375 |
| 5,136,696 | 8/1992 | Beckwith et al. | 395/375 |
| 5,226,126 | 7/1993 | McFarland et al. | 395/375 |
| 5,392,408 | 2/1995 | Fitch | 395/375 |
| 5,430,862 | 7/1995 | Smith et al. | 395/500 |
| 5,438,668 | 8/1995 | Coon et al. | 395/375 |

OTHER PUBLICATIONS

Selzer; "Four ways to Fake an X86; Picks Strengths, Minuses to Determine Suitability for Tasks; Software Emulators rarely replace an X86 system; Cloners see Their Future in RISC Cores". PC Week; Nov. 1994.

*Primary Examiner*—Alyssa H. Bowler
*Assistant Examiner*—L. Donaghue
*Attorney, Agent, or Firm*—Freilich Hornbaker Rosen

[57] ABSTRACT

A RISC architecture computer configured for emulating the instruction set of a target computer to execute software written for the target computer, e.g., an Intel 80X86, a Motorola 680X0 or a MIPS R3000. The apparatus is integrated with a core RISC computer to form a RISC computer that executes an expanded RISC instruction. The expanded RISC instruction contains data fields which designate indirect registers that point to emulation registers that correspond to registers in the target computer. The width of the emulation registers is at least the width of those in the target computer. However, a field in the expanded RISC instruction restricts the emulated width to that required by a particular emulated instruction. Additionally, the expanded RISC instruction contains a field which designates the emulation mode for condition codes and selects logic to match the condition codes of the target computer. Target instructions are parsed and dispatched to sequences of one or more expanded RISC instructions to emulate each target instruction.

25 Claims, 10 Drawing Sheets

```
15    11 10      8 7      5 4     2 1  0
|OpCode| Source1 | Source2 | Dest |tag|
```

Type I Instruction Format

|           | Position | Length |
|-----------|----------|--------|
| Op Code   | 15       | 5      |
| Source 1  | 10       | 3      |
| Source 2  | 7        | 3      |
| Dest      | 4        | 3      |
| Tag       | 1        | 2      |

Type I Format Definition Table

FIG. 5A

```
15   11 10  8 7                        0
OpCode| Reg |        Literal           |
```

Type II Instruction Format

|          | Position | Length |
|----------|----------|--------|
| Op Code  | 15       | 5      |
| Register | 10       | 3      |
| Literal  | 7        | 8      |

Type II Format Definition Table

FIG. 5B

| 31-28 | 27-24 | 23-20 | 19-16 | 15-13 | 12-9 | 8-7 | 6-5 | 4-3 | 2-0 |
|---|---|---|---|---|---|---|---|---|---|
| T | A | LOp | B | ROp | CC | T | A | B | Wid |

FIG. 6

RISC ARCHITECTURE COMPUTER CONFIGURED FOR EMULATION OF THE INSTRUCTION SET OF A TARGET COMPUTER

FIELD OF THE INVENTION

The present invention relates generally to RISC (reduced instruction set) computers useful for emulating other computers and more particularly to a RISC computer capable of executing the instruction sets of existing computers such as the Intel 80X86, the Motorola 680X0 or the MIPS R3000 processors.

BACKGROUND OF THE INVENTION

Computers are typically classified into two categories: hardwired or microprogrammed. A hardwired computer's instructions are executed by hardwired electronic circuit logic. While such an implementation is fast, hardwired logic is rigid and cannot he altered without redesigning the logic circuit. A microprogrammed (or microcoded) computer's instructions, on the other hand, are executed by a sequence of primitive operations, called microoperations, that are specified by microinstructions in a control memory. A typical microoperation is a register to register transfer operation which can be executed in one clock cycle. Sequences of microinstructions, called microprograms, are stored in a control memory which is typically a read-only memory (ROM). By altering microprograms in control memory, a processor can be made to behave like different types of computers. For example, a processor can be microprogrammed to behave like an Intel or Motorola microprocessor by simply switching sets of microprograms (called emulators) stored internally in the ROM. This process of having one computer behave like another is called emulation.

Emulation has a significant commercial implication as well, allowing rapid cloning of popular microprocessors, e.g., the Intel 80X86 or the Motorola 680X0, that dominate the personal computer (PC) market. Currently, the class of Intel 80X86 microprocessors comprise the 80286, 80386, i486, Pentium and other similar Intel CISC processors. Similarly, the class of Motorola 680X0 microprocessors comprise the 68020, 68030, 68040 and other similar Motorola CISC microprocessors. By microprogramming control logic in ROM, a "generic" microprocessor can become a clone to a popular microprocessor so that the clone can execute without modification any software written for the popular microprocessor. In the case that it has a significantly different architecture, the new microprocessor is called a software compatible clone. The clone can then become a low cost alternative and a commercial competitor to the original microprocessor.

Commercially available computers are also typically characterized as having either CISC (complex instruction set) or RISC (reduced instruction set) architectures. With a CISC architecture, an extensive instruction set is either hardwired or microprogrammed into the logic on a single chip, normally referred to as a microprocessor, that executes a fixed instruction set. Due to the complexity of the instruction set, CISC architectures typically are fairly complex, requiring large amounts of gates for implementation and associated power dissipation and normally requiring multiple clock cycles for execution of each instruction. However, with a RISC architecture the complexity of the chip is reduced by utilizing microinstructions which perform a limited subfunction of a CISC instruction, generally within a single clock cycle. This architectural choice results in a chip that requires less gates, less power and having instructions that execute significantly faster. Although each instruction accomplishes less, complex functions can be performed by combinations of the RISC instructions that are more closely tailored to a desired task than a CISC instruction that was designed to be more general purpose. Thus, a RISC computer will normally outperform a CISC computer for many types of operations. Additionally, hardware implementations of RISC computers are typically simpler and thus less expensive than CISC implementations.

While current RISC architectures are potentially capable of emulating target CISC instruction sets, this ability is limited. For example, the number and size of the registers may be significantly different between the RISC and target computers, the method of calculating and presenting condition codes may be different and the ability to parse the target instructions and relate the parsed quantities to existing registers only exists through prolonged sequences of RISC instructions. Thus, the performance of potential emulations with current RISC computers would be severely degraded and thus not feasible for most applications. To avoid these degradations, what is needed is:

1. a scheme to decode, quickly and accurately, the instruction formats of a computer being emulated; and
2. a scheme to redefine the register set, operand size and condition code calculation logic of the RISC processor according to the computer being emulated.

For this application, the following terminology is defined:

Emulation is a process in which one computer X behaves identically to another computer Y, as X executes the instructions of Y, where the internal architectures of computers X and Y are different.

A host processor is computer X which behaves like computer Y as X executes the instructions of Y.

A target processor is computer Y which is emulated by host processor X. That is, host processor X emulates target processor Y.

Microcode is a set of programs, called microprograms, that are coded in microinstructions, the native instructions of the host processor. Microinstructions are typically executed in one clock cycle to control a processor at its lowest level of specification, such as register transfers, basic arithmetic and logical operations or control transfers.

Native mode of execution is a non-emulation mode of execution by a processor; that is, execution of a computer within its inherent architecture without regard to emulation or compatibility to other computers.

SUMMARY OF THE INVENTION

The present invention is directed towards the architecture of a RISC computer configured for emulation of the instruction set of a target RISC or CISC computer and thus permitting use of existing software written for the target computer while incorporating the advantages of a RISC-based computer architecture.

Embodiments of the present invention accept instructions from the instruction set of the target computer and parse the instructions for execution by a RISC computer. By expanding the width of the instructions to the RISC computer, additional bits are included to allocate and define emulation registers within the RISC computer and to direct the parsed instructions to sequences of RISC instructions that emulate the instructions of the target computer.

An apparatus constructed in accordance with the invention preferably includes means to parse a target instruction to extract an opcode and any register/memory designation. The apparatus then dispatches the RISC computer according to the opcode to execute at least one RISC instruction. RISC instructions are expanded to include additional fields to designate indirect registers to point to the registers and the width of registers to be used. The registers are chosen from a plurality of emulation registers having widths greater than or equal to that found in the target computer. Additionally, the expanded RISC instruction contains a condition code field that designates the condition code emulation mode for condition codes. Condition codes are calculated and ordered differently for each target computer. Thus, condition code logic is selected according to the condition code field.

In accordance with a preferred embodiment, the apparatus is primarily comprised of (1) a plurality of emulation registers having widths greater than or equal to registers in the target computer, (2) a plurality of indirect registers to select the emulation registers, (3) an expanded RISC instruction having fields to select the indirect registers, the width of the emulation registers and the condition code emulation mode, (4) means for calculating the condition code according to a field in the expanded RISC instruction, (5) means to parse a target instruction into opcode and register fields and (6) dispatching means to direct execution of at least one expanded RISC instruction.

In accordance with a further aspect of a preferred embodiment, the RISC architecture computer is constructed on a single chip. The expanded RISC instructions are contained within a microcode memory. In one preferred embodiment, this microcode memory is ROM, contained within the same single chip. In an alternate embodiment, the microcode memory is RAM, located outside of the single chip RISC architecture computer.

In preferred embodiments, the target computers comprise the Intel 80X86, the Motorola 680X0 and the MIPS R3000 processors.

Other features and advantages of the present invention should become apparent from the following description of the presently-preferred embodiments, taken in conjunction with the accompanying drawings, which illustrate, by way of example, the principles of the present invention.

BRIEF DESCRIPTION OF THE DRAWINGS

FIGS. 5A and 5B comprise diagrams showing the relationship between instruction formats and instruction format definition tables for hypothetical instruction formats;

FIG. 6 is a microprogram double instruction for a preferred embodiment;

DESCRIPTION OF THE PREFERRED EMBODIMENTS

Figure 1:
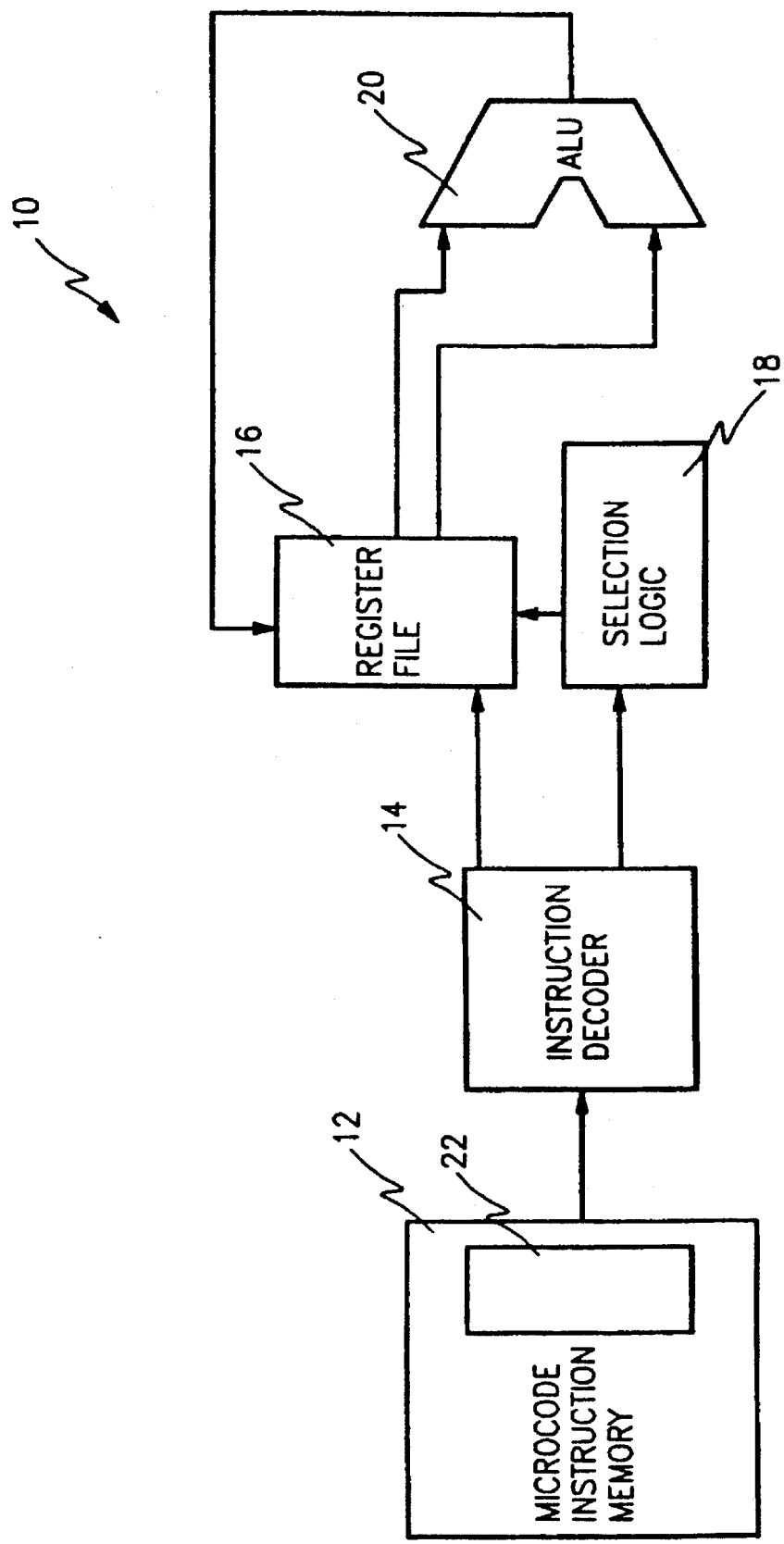
FIG. 1 comprises a functional block diagram of a typical prior art RISC computer.

Throughout the following detailed description, similar reference characters refer to similar elements in all figures of the drawings.

Figure 2:
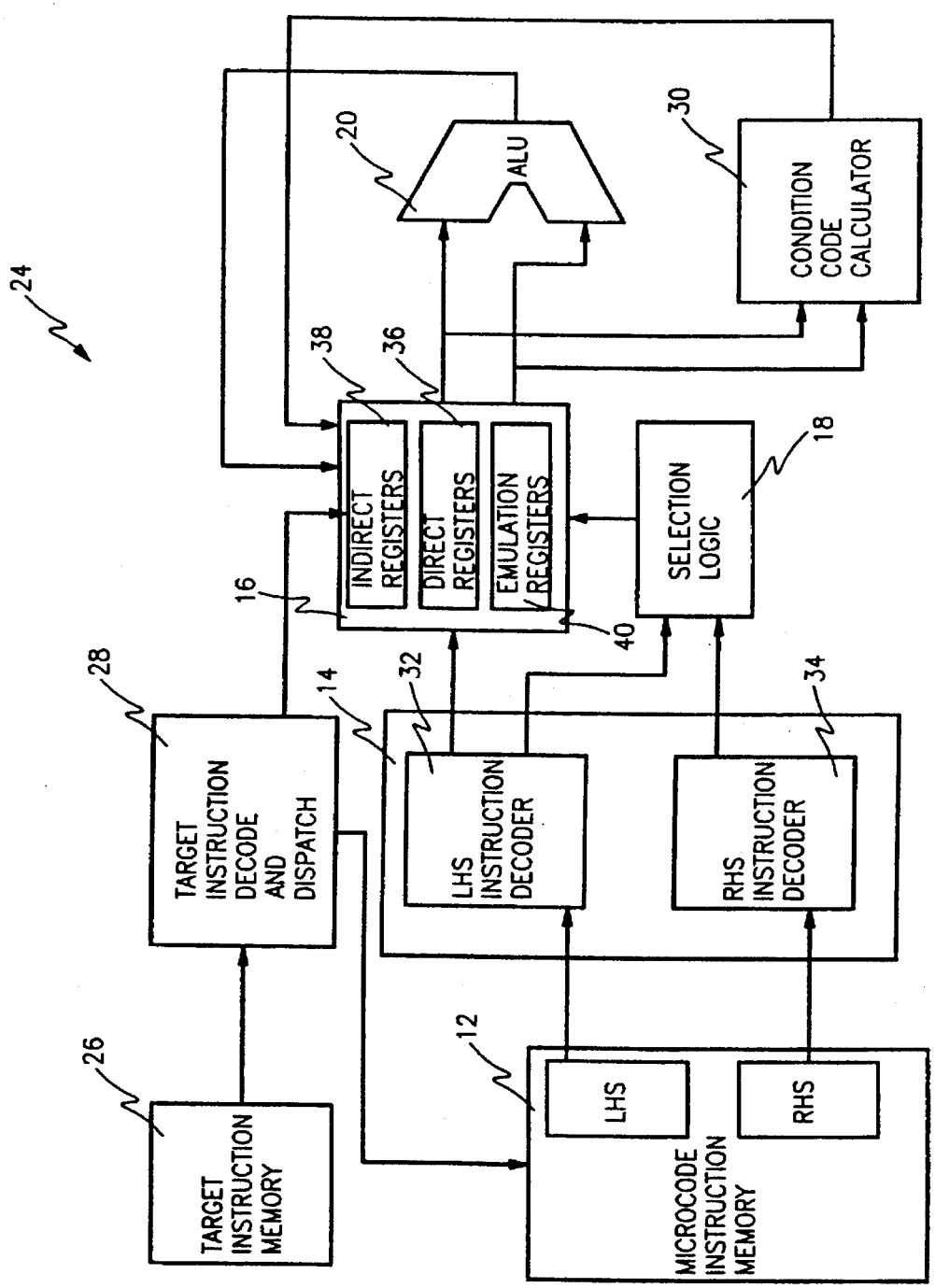
FIG. 2 comprises a functional block diagram of an embodiment of the present invention added to the RISC computer of FIG. 2.

With reference now to the drawings, and particularly to FIGS. 1 and 2, there is shown in FIG. 2 a block diagram of a preferred embodiment of the present invention as added to a typical prior art RISC computer of FIG. 1. As shown in FIG. 1, core logic of a prior art RISC computer 10 is comprised of five main functional blocks, a microcode instruction memory 12, an instruction decoder 14, a register file 16, selection logic 18 and an arithmetic logic unit (ALU) 20. The prior art RISC computer 10 is constructed to take microcoded instructions 22, stored in microcode instruction memory 12 and within a single clock cycle decode and process the majority of instructions. Within each instruction 22 there is found a plurality of fields, each comprised of a plurality of bits that primarily designate an opcode, a first operand, a second operand and a destination operand. An instruction decoder 14 decodes the opcode and selects operands from a register file 16 using selection logic 18 and directs the contents of the selected registers to the ALU 20. Additionally, the instruction decoder 14 selects the type of arithmetic instruction that the ALU 20 performs. The output of the ALU 20 is stored in the selected destination operand within the register file 16 as decoded by the instruction decoder 14 and selected by the selection logic 18. This RISC architecture is optimized for fast and efficient execution of microcoded instructions and results in a low cost chip with minimized power dissipation. However, this architecture is not particularly suitable for emulation of other computers.

With reference now to FIG. 2, the additional elements of the present invention are shown in combination with the RISC architecture of FIG. 1. While logic within the core RISC architecture remains essentially intact, many elements are expanded and other elements are added to comprise an apparatus optimized for emulation of instruction sets of other computers. A RISC computer 24 that embodies the present invention, optimized for emulation of a target computer's instruction set, is primarily comprised of eight main elements, a target instruction memory 26, a target instruction decode and dispatch 28, a microcode instruction memory 12, an instruction decoder 14, a register file 16, selection logic 18, an ALU 20 and a condition code calculator 30. In a preferred embodiment, said RISC computer 24 is a single chip and said microcode instruction memory 12 contained on said single chip is in ROM. Alternatively, the microcode instruction memory 12 is external to said single chip and consists of either RAM or ROM storage. Embodiments of the present invention first retrieve instructions from the target instruction memory 26. Instructions stored within the target instruction memory 26 are stored in an instruction format compatible with a target computer. In the presently preferred embodiments, the target computers comprise the Intel 80X86, the Motorola 680X0 and the MIPS R3000. A retrieved instruction is processed by the target instruction decode and dispatch 28, according to tables defined within, where it is parsed into fields of one or more bits, decoded and then dispatched to a particular address within the microcode instruction memory 12, dependent upon a decode of the opcode contained within the retrieved instruction. In embodiments of the present invention, the microcode instruction memory 12 contains a plurality of sequences of microcoded instructions to emulate each possible instruction found in the target computer's instruction set. However, as described below, the potential required number of emulated instructions is restricted by the use of indirect registers.

While the RISC computer 24 may contain N bits per instruction in its native mode, embodiments of the present invention contain an additional M bits per instruction, or N+M bits per expanded RISC instruction. Contained within the additional M bits and used in conjunction with the N bits are directions on the use of resources within the RISC computer 24, peculiar to each emulated instruction. The native N bits are referred to as the LHS (left-hand side) of the instruction while the M bits are referred to as the RHS (right-hand side) of the instruction. In a preferred embodiment, these fields of data are separate within the N+M bits of the expanded instruction. However, this separation is for convenience in discussion and in the design of associated additional logic and utilization of existing core logic and is not a limitation in the present invention. In a preferred embodiment, currently being manufactured by the assignee of the present invention and designated at the IMS-3250, the core RISC computer contains 16 bits as the LHS with an additional 16 bits added to form the RHS, thus 32 bits are stored in the microcode instruction memory 12 per expanded instruction. In an alternate embodiment, 16 bits are added to a 32-bit core RISC computer to form a 48-bit instruction. It should be apparent to one of ordinary skill in the art that the present invention is not limited to particular lengths for the LHS, RHS, or the total instruction.

The instruction decoder 14 is comprised of a LHS instruction decoder 32 and a RHS instruction decoder 34 in the present invention. The output of both decoders 32 and 34 are used to instruct the selection logic 18 and select the particular registers from within the register file 16 to be used as operands for the particular opcode. The register file 16 is comprised of direct registers 36, indirect registers 38 and emulation registers 40. To permit efficient emulation, the emulation registers 40 are constructed with widths greater than or equal to the size of the largest register in the target computer. The quantity of emulation registers 40 is greater than or equal to the quantity of registers within the target computer. This quantity can exceed and thus is not limited by the quantity of direct registers 36, as found in the core RISC computer. By configuring the indirect registers 38 to point to particular emulation registers 40, classes of instructions, e.g., register-to-register moves, can be emulated by the identical sequence of microcode once the indirect registers 38 are loaded by the target instruction decode and dispatch 28.

Not all instructions operate on binary quantities of the same width. For example, the Intel i486 uses instructions that are either 8, 16 or 32 bits wide. Thus, embodiments of the present invention use a field within the RHS to configure the emulation register 40 to the size required for the particular emulated instruction. Similarly, this field determines the width of the operation performed by the ALU 20. As previously described, the ALU 20 receives data quantities from operands within the register file 16 and stores its result in a destination operand within the register file 16.

CISCs (complex instruction set computers) additionally use a condition code in performing operations in the ALU and executing conditional instructions. This condition code logic is peculiar to each emulation. Although condition codes could be calculated with microcoded instructions, such an emulation would be very time consuming. Therefore, the present invention uses the condition code calculator 30, a block of logic for each emulation as controlled by the RHS. Thus, a majority of instructions still executes within a single clock cycle. In a preferred embodiment, logic associated with each emulated target computer is found on a single-chip RISC emulation of the selected target computer, e.g., the Intel 80X86 and the Motorola 680X0. Note that the MIPS R3000 does not use condition codes and thus does not require the use of condition code logic. Therefore, neither block of logic is enabled for MIPS R3000 emulation. Thus, in a preferred embodiment, the identical single-chip RISC computer can emulate either the Intel 80X86, the Motorola 680X0 or the MIPS R3000 with only changes in microcoded instructions placed in the microcode instruction memory 12 and tables in the target instruction decode and dispatch 28. It should be readily apparent to one of ordinary skill in the art that different computers or combinations of computers can be similarly designed by using the architecture described.

Figure 3:
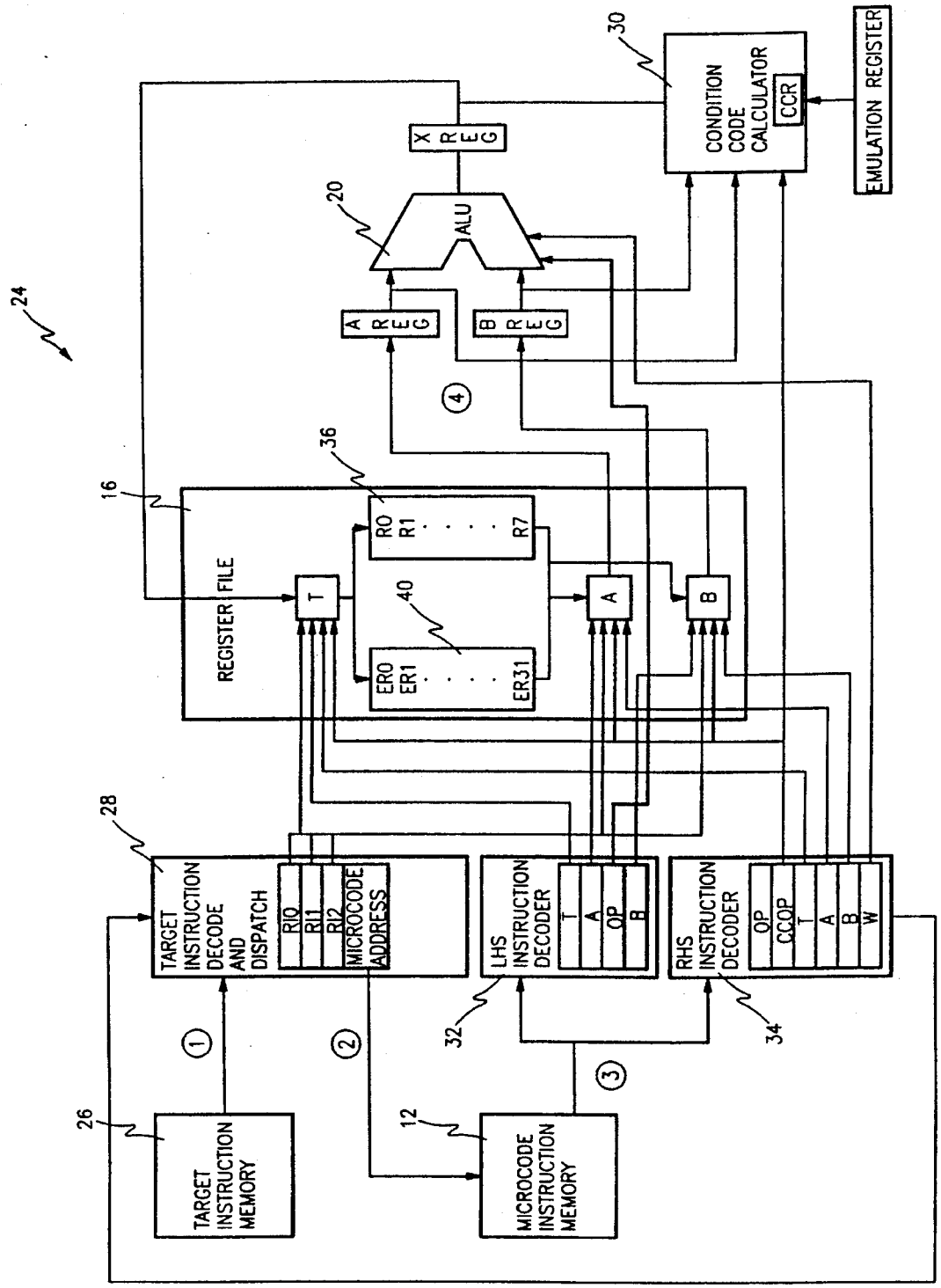
FIG. 3 comprises a detailed block diagram shown the emulated instruction decode sequence for an embodiment of the present invention.

With reference now to FIG. 3, there is shown a more detailed flow diagram of the instruction decode showing the flow of data within the present invention. In step 1, instructions compatible with a target computer are fetched from the target computer instruction memory 26 and parsed into fields by the target instruction decode and dispatch 28. Indirect registers RI0, RI1 and RI2 within the target instruction decode and dispatch 28 are loaded with pointers to emulation registers 40 as part of this parsing and it is these registers that determine the physical location of the emulated operands. In step 2, the opcode is converted into an address that points to a sequence of microcoded instructions for each opcode. Typically, this conversion is done by a 2-bit left shift of the opcode followed by adding this quantity to a base address. This permits four microcoded instructions per opcode. When this quantity is insufficient, a microcoded jump instruction can be used to permit the length of the microcoded sequence to be extended.

In step 3, the first instruction of the microcoded sequence, comprised of a LHS and a RHS, is fetched and decoded by the LHS decode 32 and the RHS decode 34. The LHS decode 32 decodes the LHS into four fields, OP, A, B and T. The OP field designates the function to be performed on the A and B operands and the T field designates the destination operand. The RHS decode 34 decodes the RHS into six fields: OP, A, B, T, W and CCop. The OP field determines the interaction of the fields of the RHS with the LHS. Typically, the A, B and T field select a particular indirect register, IR0–IR2, which in turn selects an emulation register ER0–ER31 in step 4 which is used for the arithmetic operation. The W field determines the arithmetic width of each of the operands and the ALU 20. The CCop field selects the condition code logic peculiar to each condition code emulation mode used for the particular target computer emulation, e.g., the Intel 80X86 or Motorola 680X0.

In step 4, the ALU 20 performs an operation on the selected A and B operands. The result is stored in the T register in the register file 16 via an intermediate register, xreg. A condition code is generated by the condition code calculator 30 as a function of this arithmetic operation and dependent upon the condition code logic selection of the CCop field.

The next microcoded instruction is fetched in step 3 and the process is continued until a DD0, a decode and dispatch instruction designating the end of the microcoded sequence, is encountered in the RHS. Upon encountering the DD0, the sequence recommences at step 1 by fetching the next instruction from the target computer instruction memory 26. This operation continues indefinitely dependent upon the instruction sequence in the target computer instruction memory 26.

Figure 4:
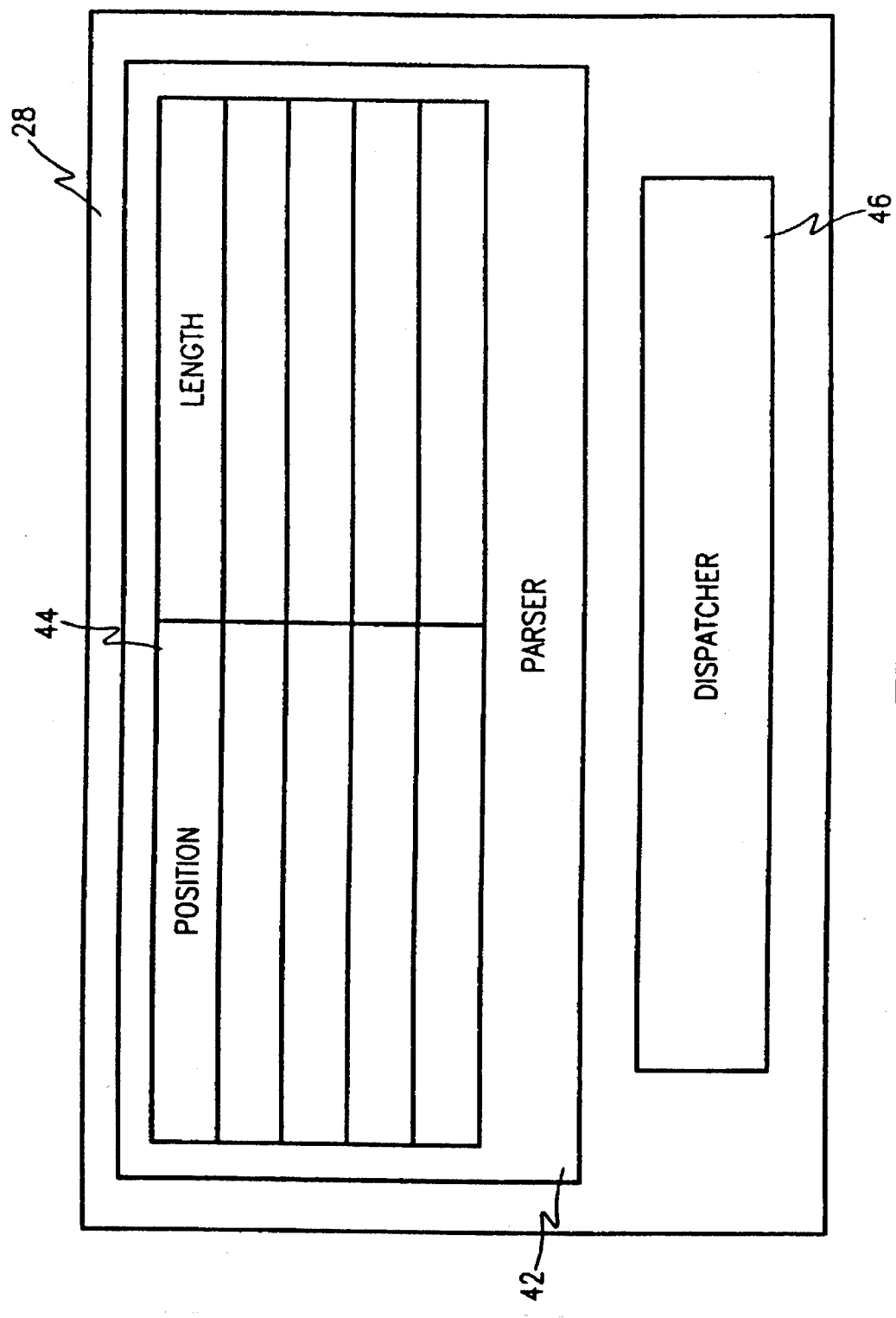
FIG. 4 comprises a functional block diagram of the target instruction decode and dispatch used for embodiments of the present invention.

With reference now to FIG. 4, there is shown a block diagram of the target instruction decoder 28 comprised of an instruction parser 42 with an instruction format definition table 44 contained within, and a dispatcher 46. In emulation, the emulating (host) processor must parse the machine instruction of the emulated processor in order to decode it. To parse an instruction, the emulating processor must know the instruction format of the emulated processor so that proper fields can be identified and their codes extracted and decoded. In embodiments of the present invention, this data is contained within the instruction format definition table 44. This table-based instruction format definition 44 enables an emulating processor to interpret many different machine instructions by simply changing the table contents, preferably located in ROM within the emulating processor chip, to represent the format of the emulated processor.

In the instruction format definition table 44, each entry consists of a pair of numbers: a first number identifying the starting bit position of a field within an instruction and a second number indicating the length of the field. The instruction format definition table 44 contains an entry for every field in the target instruction format. For every target instruction format type, there is a unique instruction format definition table 44. With reference to FIGS. 5A and 5B, there are shown examples of an instruction format definition table 44 for hypothetical Type I and II instruction formats. In a Type I instruction format, as shown in FIG. 5A, an opcode field starts at bit position 15 and is 5 bits long. Two source operand fields start at bit positions 10 and 7, respectively, and are both 3 bits long. A destination register, where the result of this instruction is stored, is specified in a 3-bit field that starts at bit 4. A 2-bit tag field for specifying special conditions starts at bit 1. Similarly, in a Type II instruction format, as shown in FIG. 5B, an opcode field starts at bit position 15 and is 5 bits long, a register field starts at bit 10 and is 3 bits long and a literal field starts at bit 7 and is 8 bits long.

The instruction format definition table 44, contained within the target instruction decode and dispatch 28, is used by the instruction parser 42 during emulation. In parsing a machine instruction of the emulated processor, the instruction parser 42 chooses an appropriate format definition table for parsing. This choice is typically made by examining a certain field, typically the opcode, which determines a particular instruction format type. For example, an opcode determines whether the instruction type is a simple register-to-register type, literal type or control transfer type, etc. In some cases, a small (header) field in the instruction specifies the instruction format type. Based on this information, the instruction parser 42 selects a particular format definition table 44. Looking up each table entry, the instruction parser 42 extracts separate fields from the instruction for subsequent decoding. In an alternate preferred embodiment, the instruction parser 42 is instead implemented in hardwired logic without the previously described tables.

The instruction parser 42 also loads the parsed quantities into indirect registers, RI0–RI2, in the register file 16. Once the opcode has been extracted, the dispatcher 46 then uses the opcode to determine a starting address for a sequence of microinstructions in the microcode instruction memory 12. In a preferred embodiment, the starting address is determined by a 2-bit left shift of the binary quantity in the opcode followed by adding this result to a base address. This results in addresses separated by four locations, sufficient for most microcode sequences. However, when necessary a microcoded jump instruction can be used to extend the length of the microcoded sequence.

Normally, the target instruction decode and dispatch 28 awaits execution of a specific instruction, DD0, before it fetches, parses, and dispatches the next instruction from the target instruction memory 26. However, in a preferred embodiment the instruction decoder 14 can recognize instructions that can be emulated in a single microinstruction. When the instruction decoder 14 recognizes such instructions, an implicit DD0 is executed concurrent with the single microinstruction within a single clock cycle, thus improving throughput. This operation is shown as path 5 in FIG. 3.

With reference now to the following, there is shown a detailed description of the structure of the instructions utilized in embodiments in the present invention. Embodiments of the present invention execute two instructions simultaneously designated as the LHS (left hand side) and RHS (right hand side) instructions which are the host processor equivalent of the target processor's instruction. The RHS re-defines the following three specifications of the primary instruction, reflecting the architecture of the target processor:

1. register assignments and implicitly their connecting data paths;
2. data and address sizes; and
3. condition code calculation.

Together these specifications determine appropriate data size, program size, and processor's suitability to certain application domains. A proper definition of the three characteristics assures that the intended operands are used and, after the execution, accurate register contents and condition indicators of the emulated processor are maintained.

Embodiments of the present invention use the RHS to redefine, during emulation of a target processor operation, the register data paths, data size, and condition code calculation of the LHS, to correspond to the target processor instruction being emulated, permitting the host processor to mirror, without physical changes, the target processor architecture being emulated.

In a preferred embodiment, a 32-bit microprogram word is used that contains two 16-bit microinstructions. The LHS (left-hand side instruction) performs arithmetic and logical operations and alters register contents. It has the form:

T:=A LOp B;

where T is a destination register, A is a source register, B is a source register, and LOp is the left-hand side operation code. The operation code, LOp, which may be an arithmetic, logical or shift operator, operates on data from A and B and transfers the result to the register specified in T.

The RHS (right-hand side instruction) has the form:

ROp specification where ROp is the right-hand side operation code and specification is up to 12 bits which further define the ROp. In the native mode, the right-hand side instructions are typically used for control transfer, or other purposes which do not require the specification of two source and one target register.

With reference to FIG. 6, there is shown a microprogram double instruction for a preferred embodiment. The two 16-bit microinstructions are executed in one clock cycle as two separate instructions: one with the LOp opcode and the other with the ROp opcode. For special cases, where the execution of the left-hand side instruction is being used to emulate target processor instructions, the register data paths, the data size and the condition code calculation need to be explicitly redefined. The usual host register data paths are the general registers or special registers of the host processor, and need to be changed to use the emulation registers, which are used to emulate the registers of the target processor. The normal data size of the host processor is 32 bits and may need to be changed to 16 or 8 bits to reflect the operation being emulated. The host processor generates four condition codes within the native architecture; the target processor typically has a much more extensive set of condition codes, which need to be generated. The right-hand side instruction specifies these differences between host and target processors, by modifying the left-hand side operation as follows:

1. re-designates register references;
2. specifies arithmetic widths; and
3. determines condition code strategy.

Re-designating Register References

Under normal operation, each of the T, A and B fields specified in left-hand side instruction selects one of 16 registers that comprise the register set of the host processor. These include the general registers, memory, and various special registers. When the ROp (op code for the right-hand side instruction) is either an AR (Alternate Registers) or a DD (Decode and Dispatch), however, it can override the normal register reference made by fields T, A and B of the left-hand side instruction. The three fields T, A and B of the right-hand side instruction may re-select one of three alternate sets of 16 registers or, if the value of any of the three bit fields is 0, the original register selection of the corresponding field of the left-hand side instruction is not altered. Two of the register sets select emulation registers 0 through 15, and 16 through 31, which are used to emulate the target machine registers.

The third set of 16 values also access the emulation registers, but they do so in a variety of specialized ways. One way is through indirect pointer registers, RI0–RI2. During the process of decoding the target processor instructions, the register fields are extracted and stored into three indirect register pointers. These registers may contain any of the values 0–31, and when referenced as a T, A or B field, the emulation register pointed by the indirect register pointer is used. Another way in which the indirect register pointers are used is to access the emulation registers as byte registers. Instead of the values 0–7 referring to emulation registers 0–7, they refer to byte registers 0–7, which are 8 specific byte registers in the 32 emulation registers. Similarly, the values 0–7 can automatically have 8 added to them before the emulation register is selected. Also these indirect register pointers themselves (rather than the register they point to) can be accessed as the T, A and B fields of the left hand side instruction.

For example, the target instruction might be an instruction which adds emulation registers (ERs):

ER5:=ER8+ER11

Figure 7:
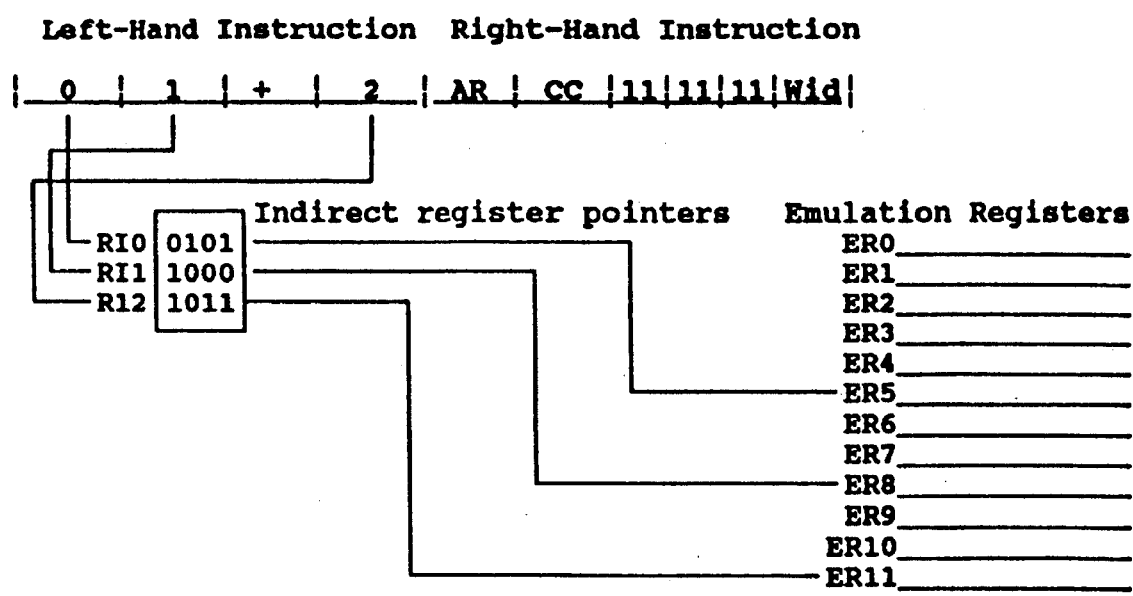
FIG. 7 is a flow diagram of the decode of a typical instruction.

The target instruction decode and dispatch 28 would put the value 5 in RI0, 8 in RI1 and 11 in RI2 during the 1-cycle target instruction decode (which happens prior to the execution of the instruction we are discussing). The right-hand side AR instruction would be used to alter the left-hand side add instruction of the host processor to use the emulation registers. It would be written as a microinstruction as: RI0:=RI1+RI2. Thus, as shown in FIG. 7, RI0 has a binary value of 5, RI0 has a binary value of 8 and RI2 has a binary value of 11. The actual operation within the host processor then operates upon the emulation registers pointed to by the indirect registers. This operation is shown in FIG. 7.

Arithmetic Size

The arithmetic size of the target processor is specified in the width (Wid) field (bits 0-2) of the right-hand side instruction. With certain ROp codes, the Wid field can redefine the size of the operand source resisters and/or the destination register to be used by the left-hand side instruction. In a preferred embodiment, the Wid field has the following meaning:

| Wid | Meaning |
| --- | --- |
| 000 | Do 8-bit arithmetic |
| 001 | Do 16-bit arithmetic |
| 010 | Do 32-bit arithmetic |
| 100 | Do 16 or 32-bit arithmetic based on current operand width |
| 101 | Do 16 or 32-bit arithmetic based on current address width |
| 110 | Do 16 or 32-bit arithmetic based on current stack width |

For left-hand side instructions which read data from memory, this field can also specify the width of the data being read. Using this field, the host processor can perform arithmetic operations on data types or various widths, for increased versatility in emulation.

Condition Code Interpretation

In embodiments of the present invention, selection of condition code indicators is specified in the CC field (bits 9–12) of the AR right-hand side instruction. Two sets of 16 condition code calculation strategies are used. The set selected is determined by a bit in a register which specifies which processor is being emulated. The strategy for that processor is selected by the CC field (condition code operation). The condition code operation is used to select one of several condition code calculation strategies, i.e., condition code emulation modes, for each of the different condition codes available in the special hardware register called the Condition Code Register (CCR). The Condition Code Register is a register in which each bit represents the presence/absence of specific processor conditions.

| for the 68040: | |
| --- | --- |
| X | special condition code |
| N | negative |
| V | overflow |
| Z | zero |
| C | carry |
| for the i486: | |
| P | parity |
| A | auxiliary |
| S | sign |
| O | overflow |
| Z' | zero |
| C' | carry |

If the target processor is the 68040, the CCR is returned as:

| 31 16 | 15 12 | 11 10 | 8 7 6 5 4 3 2 1 0 |
| --- | --- | --- | --- |
| 0 | x | 0 | x 0 0 0 X N Z V C |

If the target processor is the i486, the CCR is returned as: as:

| 31 22 | 21 16 | 15 | 11 | 7 6 5 4 3 2 1 0 |
| --- | --- | --- | --- | --- |
| 0 | x | 0 x x x 0 x x x | S Z' 0 A 0 P 1 C' |

If the target processor is the MIPS R3000, there are no condition codes calculated, but any add or subtract LHS instruction with a RHS instruction which requests that condition codes be set (any CCop) causes an overflow exception.

During selected cycles which specifically emulate a target machine instruction, the AR right-hand side instruction can specify that the Condition Code Register be used to store the condition bits calculated using the rules for execution processing unique to the target machine. The host processor condition codes are unaffected by the periodic setting of the CCR. The CCR is one of the registers available via A field references in the left-hand side instructions and thus can be tested for the presence or absence of specific bits.

In an alternate embodiment, the target instruction decode and dispatch 28 can be selectively configured to accept instructions native to the host processor and dispatch them directly to the instruction decoder 14. When operating in this native mode, the RHS instruction decoder 34 does not effect the instruction decoding of the LHS instruction, thus permitting the RISC processor 24 to selectively operate in its native mode as well as in an emulation mode. Thus, in this mode the RISC processor 24 operates on external (target) native microcode instructions.

Typically, not all binary combinations of data bits represent instructions for a target processor. Thus, a target processor must trap illegal instructions, i.e., combinations of data bits that are illegal for a target processor, peculiar to its implementation. Since the present invention defines each emulated instruction by a sequence of RISC instructions it can, in an alternate embodiment, also define additional functions into its microcode corresponding to individual illegal instructions from the target instruction set. For example, a particular illegal instruction can corresponding to a FFT (Fast Fourier Transform), useful for speech processing, encoded in microcode in the host processor. Such expanded instructions are chosen to respond to the peculiar needs, i.e., hot spots, of a particular application. Thus, the host processor can emulate target instructions for a target processor while additionally providing significant performance increases over the target processor by taking advantage of an expanded and specialized instruction set.

Figure 8A:
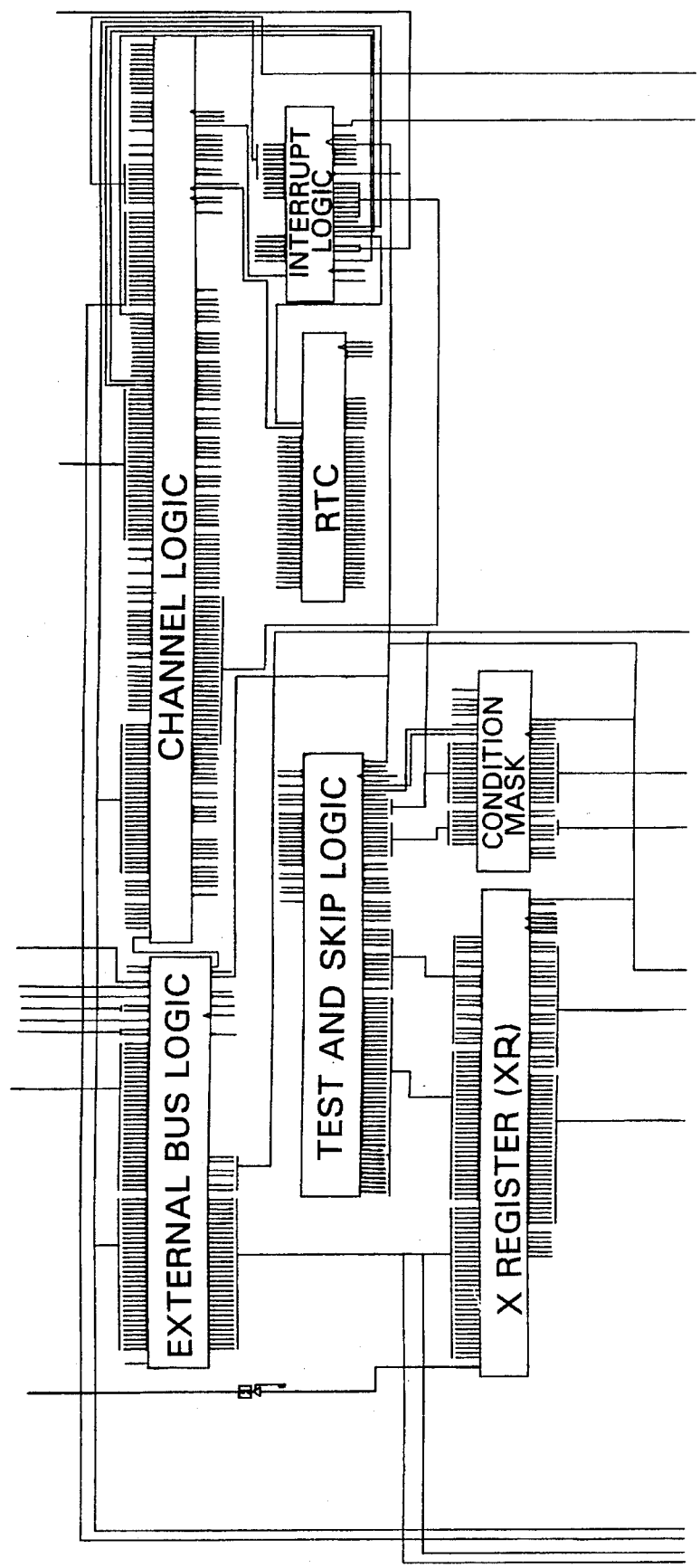
FIGS. 8A, 8B and 8C respectively represent contiguous, vertically-displaced portions in descending order of a block diagram of the processor of a preferred embodiment.
Figure 8B:
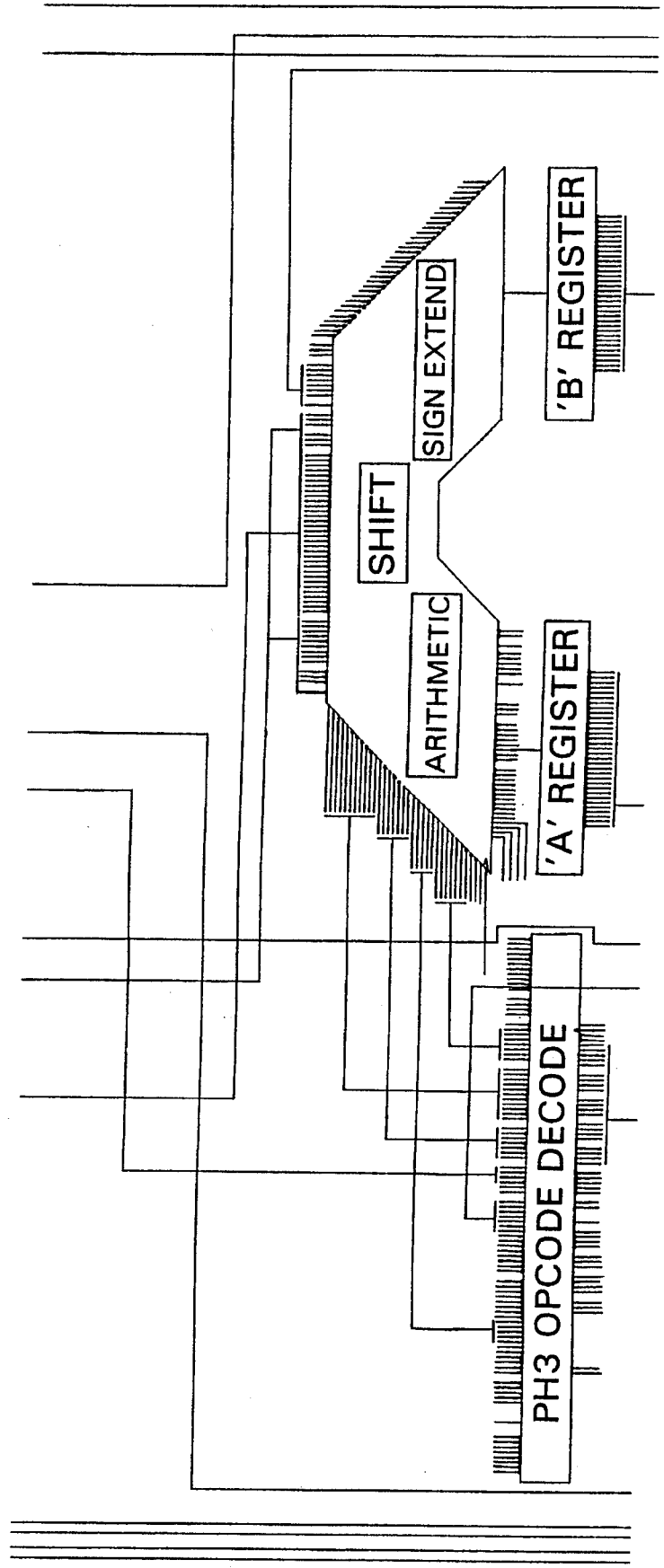
Figure 8C:
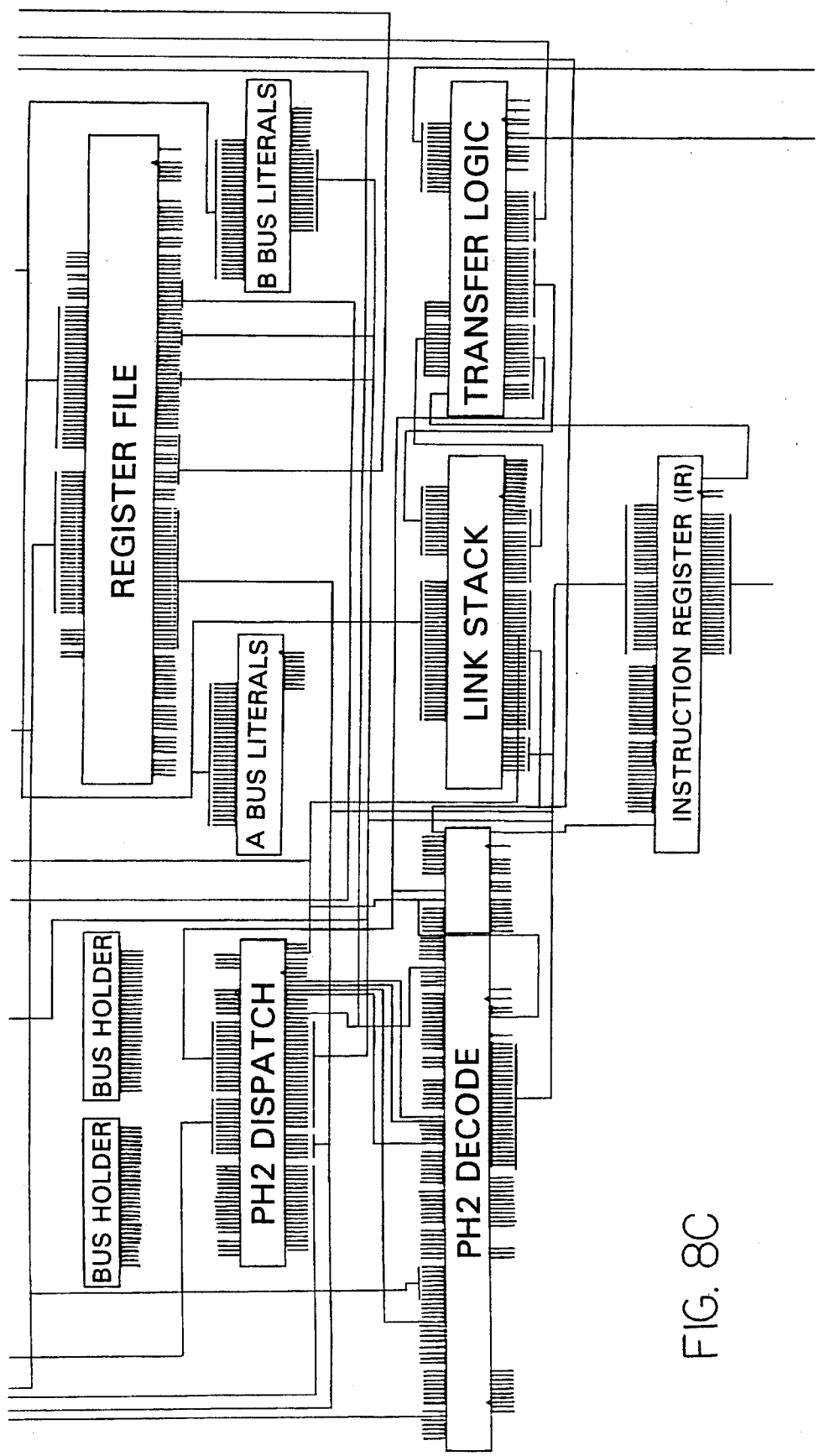

With reference to the following, a description is provided below of a preferred embodiment of the present invention. In this preferred embodiment being manufactured by the assignee of the present invention and designated as the IMS-3250B, a core RISC processor having a 16-bit LHS is enhanced with a 16-bit RHS to provide emulations of alternatively the Intel i486, the Motorola 68040 (m40) or the MIPS R3000 processors. A block diagram of the processor of this preferred embodiment is shown in FIGS. 8A, 8B and 8C.

General Description

3250B Instructions Formats

The IMS-3250B instruction format is 32 bits wide. It is organized as a three operand assignment statement of the form: T :=A LOp B as a left hand side (LHS) instruction. The T, A and B fields are register assignments or B is a 16 bit literal.

If B is not a 16-bit wide literal then a right hand side (RHS) instruction can exist consisting of ROp as an operation code and the address field as a single or multiple argument or operand.

The two possible instruction formats are described below. Bits 31-16 are common to both formats.

Format with binary LOP and 16 bit B field literal

-continued
```
31-28 27-24 23-20 19-16 15------------------------0
| T | A |LOp | B |        Literal (16)          |
```

Format with binary LOp and ROp
```
31-28 27-24 23-20 19-16 15-12 11------------------------0
| T | A |LOp | B |ROp |        Address (12)       |
```

There are two variations on the second format. One LOp is reserved as the 'unary' opcode. In this case the B field is one of 16 unary sub-opcodes.

Format with unary LOp and ROp
```
31-28 27-24 23-20 19-16  15-12 11------------------------0
| T | A |LOp |subop |ROp |        Address (12)       |
```

Similarly, one ROp is reserved as the 'subop' opcode. In that case, bits 11-8 are used as a sub-opcode and the address field is 8 bits.

Format with RHS 8 bit address subop
```
31-28 27-24 23-20  19-16 15-12  11------8 7--------------------0
| T | A | LOp| B | ROp| subop | Address (8)    |
```

Registers

The processor contains eight 32-bit general registers. It has thirty two 32-bit emulation registers, used to hold the contents of the emulated machine's registers. There are eight 80-bit floating point registers. The floating point exponents (16 bit) are separate registers, but the eight 32-bit most significant words, and the eight 32-bit least significant words, share emulation registers (31–16).

There are three indirect register pointers which can be used in the T, A or B operand fields to refer to one of the emulated registers. These indirect registers (RI0, RI1 and RI2) are loaded with pointers to the actual registers referred to by the emulated instruction, as part of the emulated instruction decode, prior to dispatching the emulation microinstructions.

There are also sixteen 32-bit, and sixteen 16-bit "memory" registers (registers which can be implemented as memory) used to emulate internal registers and record various states of the emulated machines.

Link Stack

The processor contains a 32-bit wide, 8 element deep last in first out register stack. A store reference to the link stack registers (LSR) in the T field of an instruction LHS causes the result of the instruction to be 'pushed' onto the stack. Similarly, a reference to the link stack registers (LSR) in the B field of an instruction LHS causes the top of the stack to be accessed and 'popped'.

The Link Stack is also manipulated by the RHS instructions LINK and RETURN, which 'push' and 'pop' subroutine call return point addresses to/from the stack.

Memories

The 3250B processor has a two memory architecture. They are:

1) Instruction Memory

This memory is 32 bits wide and 16K to 64K words deep. It is addressed each clock cycle by an independent 16-bit wide instruction address bus.

2) External Memory

This memory can be 2, 4, 8 or 16 megabytes in extent. It is assumed to be composed of 1M or 2M×32 industry standard DRAM SIMMs. The memory is organized as a 64-bit wide memory, in one or two banks. It is read as one or two 32-bit data words. It can be written in units of byte (8 bits), halfword (16 bits) or word (32 bits).

Access to the memory is via an on-chip multi-channel (3) memory controller which provides a sixteen byte read buffer for a read only emulated instruction stream channel, and two 7-byte read buffers for the two read write channels. There are also two 4-byte write buffers for the read write channels.

Memory Controller

The Memory Controller (MC) provides a direct electrical interconnection between the logic of the IMS-3250B and a dynamic random access memory (DRAM) subsystem. Current drivers for address, CAS, RAS and write enable signals are incorporated within the IMS-3250.

The Memory Controller features of the IMS-3250B processor are controlled by references to MC registers in the T and A fields of LHS instructions. As such, the registers of the MC are simply part of the addressable register set of the main processor. The MC actually functions like a co-processor in support of the main processor and is capable of executing in parallel with the main processor. The MC, however, does not have a set of instructions which it executes, but rather is capable of performing I/O functions in parallel with and initiated by the main processor.

The MC functions of the IMS-3250B are customized to the support of the real machine emulation of the i486, the m40 and the MIPS microprocessors. There are three channels used to support this emulation environment. One channel, the instruction stream channel, is read-only and is used as a source of instructions to be emulated. It automatically increments the channel address after each read.

The other two channels (channels 1 and 2) have read/write capabilities and are used for operand fetching and storing to DRAM in the emulation environment. Their addressing mode is fixed as 'byte mode' with the ability to read/write bytes, halfwords or words, from any byte address, under program control.

Channel 2 is used by the instruction stream pre-decoder for the effective address of any memory touching instructions being decoded. The address is stored in CAR_2. When the instruction is dispatched, the address is moved into channel 1, freeing channel 2 for overlapped storing of the next effective address. For some string operations the use of channel 2 for effective addresses is suspended, to allow the string operation to use two channels. Other microcode may use both channels, but it has the responsibility to restore the effective address, if any, which was in channel 2, prior to allowing the next instruction to dispatch.

The order in which bytes are ordered within memory is specified for both channels by the "E" (endian) bit in an emulation mode register (EMR).

A Channel Parameter Register (CPR) contains bits specifying the width of operations for the read/write channels and the numbers of the channel segment register sets associated with them. The channel segment registers are six sets of two registers which contain the base address and the extent of "segments" within the DRAM, along with various flags to control access to the data contained within the segments. The instruction stream channel always uses segment register set 1.

The address from which the instruction stream will be read is stored in an Instruction Pointer register (IP) associated with the channel. The IP is stored into by reference in the T field of a LHS instruction. The assembler mnemonic is 'LDIS' (load instruction stream).

The addresses at which data will be accessed are contained in Channel Address Registers (CAR_1 and CAR_2) associated with the I/O channels. The CARs are loaded by storing into them by reference in the T field of a LHS instruction. The assembler mnemonics are 'LD_n', 'LDF_n', and 'LFDP_n' for the two I/O channels, where n is the channel number. As stated earlier, the address is always assumed to be in units of bytes. When a channel address is loaded, extent and access tests are performed on the address for purposes of memory protection.

The T field mnemonic 'LD_n' (load) loads the I/O Channels Address Register and performs extent and write-protection tests. The physical address is stored in the memory controller, and the memory controller is prepared for a subsequent data write.

The T field mnemonic 'LDF_n' (load and fetch) loads the I/O Channel Address Register, performs read-protection tests, and initiates an initial external memory 32 or 56-bit wide read which encompasses the word, halfword or byte referenced by the CAR.

The T field mnemonic 'LDFP_n' functions like an LDF_n, and also indicates that a subsequent write to the same address should be anticipated, and write access tests performed.

The T field mnemonics 'LDX_n', 'LDFX_n' and 'LDFPX_n' perform the protection tests exactly like the former without the 'X', and any faults are stored in the fault register, but the operation is not forwarded to the memory controller, and faults will not result in a fault interrupt. The microcode has the responsibility to clear the fault interrupt and the fault register.

The T field mnemonic 'LDIS' initiates the instruction stream fetch at the specified address, performs read-protection tests, and initiates an initial external memory 32 or 64-bit wide read, depending on the address referenced by the IP. Additional addresses and 64-bit reads are generated by the channel by incrementing the initial address until the channel's 16-byte buffer is filled, and 8 more bytes are "on chip".

The T field mnemonic 'WR_n' (write) allows for writing data to the external memory. Following a 'LD_n' or a LDFP_n T field reference, a 'WR' T field reference will cause one word, halfword or byte to be written to the external memory.

The T field mnemonic WRI_n (write and increment) performs the write, and then increments the channel's CAR_n by the width specified in the CPR and performs all the functions of an LD_n with the new address (except that faults are suppressed until the next WR_n or WRI_n is encountered).

Memory Controller A field references permit data that has been read thru the I/O Channel to be assigned as an A operand of a LHS processor instruction. The A field mnemonic 'RD_n' (read) specifies the next word (halfword or byte), as controlled by the width field of the Channel Parameter Register, as the A operand data for the LHS instruction.

The A field mnemonic RDI_n (read and increment) performs the read, and then increments the channel's CAR_n by the width specified in the CPR and performs all the functions of an LDF_n with the new address (except that faults are suppressed until the next RD_n or RDI_n is encountered).

The segment registers within the MC portion of the IMS-3250B are referenced using T and A field mnemonics. The T field mnemonic 'CBR_n' loads segment n's Channel Base Register in units of bytes. The channel Address Register and the associated segment's CBR are added to give the logical address of the data.

The T field mnemonic 'CER_n' loads segment n's Channel Extent Register in units of bytes. The value of the channel Address Register is not allowed to exceed the value of the associated segment's CER. A channel address exception fault is generated in response to this condition. The CER also contains an access mode and a privilege level which are used in i486 protected mode emulation. A channel access or privilege exception fault is generated if access or privilege level rules are violated.

The A field mnemonic 'CAR_n' allows accessing the channel address registers and IP accesses the current instruction's address.

Cache Controller

The IMS-3250B also contains a cache controller and cache tag registers to be used in conjunction with external SRAM caches. There are separate 1K byte instruction and data caches which will be used in the IMS-3250B to help evaluate performance with caches. Later versions may have larger caches, as desired by customers. The instruction cache has 16-byte strings, and the data cache has 8-byte strings. The data cache is a write back cache. The data cache snoops the instruction cache to insure coherency.

There are four cache modes, selectable by two bits in the emulation mode register. The modes are no cache, normal cache, cache only, and locked cache. In the no cache mode all memory references go to the DRAM. In the cache only mode, the cache tags are ignored and the cache is always accessed. In the locked cache mode the contents of the cache tag registers (and the cache) are frozen.

Paging Hardware

Both the m40 and the i486 have paging hardware implemented. To emulate these features the IMS-3250B has a Memory Management Unit (MMU) which contains a Translation Lookaside Buffer (TLB), which is an associative memory with 32 entries. The set of 32 TLBLOG registers contain the logical addresses corresponding to the 32 TLB-PHS registers, which contain the address of the associated physical page of memory. A TLBI register contains the index of the last entry inserted into the associative memory and four TTR registers specify two transparent translation address ranges (ranges of addresses which do not go through the page translation) for instructions and data.

Interrupt/Fault Structure:

Nine maskable interrupts and seven faults are provided in the architecture of the IMS-3250B to assist in the implementation of various time critical functions and to detect faults which may occur in the system. Seven of the interrupts are "hard-wired" internally within the 3250. The other two interrupts are mapped onto two external general purpose interrupt pins by printed circuit board wiring on the mother board into which the IMS-3250B is integrated. The faults are all "hard-wired" internally within the 3250.

The interrupts and faults are maskable, under program control, by bits in the Interrupt Mask Register (IMR). The interrupts are interrogated at emulated instruction dispatch time, and control transfers to location 0 if any non-masked interrupt is present. Thus, interrupts are constrained to occur only at the beginning of the emulation of an emulated machine instruction. The interrupts can be interrogated and are resetable under program control.

Faults differ from interrupts in that they cause an immediate transfer to location 0 when discovered. The pipe line is flushed. The appropriate bits are set in the fault register (FR). Faults are maskable as a group rather than individually.

Power Management Considerations

The IMS-3250, in anticipation of being used in a battery powered environment, has been provided with features which allow it to function at reduced power requirements. The IMS-3250B is implemented in CMOS technology and consequently the power used by the device is roughly proportional to the clock frequency at which it is operated. This reduced power at reduced clock frequency phenomenon is at the heart of the IMS-3250B Power Management strategy.

The clock frequency is programmable via microcode, and special instruction can be introduced in the 80X86 and 680X0 emulators to facilitate software access to this basic power management capability. Using the microcode instruction SCF (Set Clock Frequency), the clock frequency of part one of the IMS-3250B can be reduced from its maximum rate, by powers of two, to $\frac{1}{128}$th of its maximum rate, or to a full halt. The processor will continue to execute and emulate its assigned instruction set at this new clock rate until the clock frequency is reestablished by a subsequent SCF instruction or until an interrupt is detected. An interrupt will cause the processor to be instantly restored to its maximum clock rate. An interrupt routine can re-establish the clock rate in use immediately prior to the interrupt by use of the microcode instruction RCF (restore Clock Frequency).

Major logic sections of the IMS-3250B, such as the multiplier and the TLB, are isolated so that they only draw power when in use.

Power management for the peripheral portion of an IMS-3250B based computer can be achieved in a variety of methods which are largely a function of the architecture of the peripheral environment. The input/output capabilities of the IMS-3250B are sufficiently broad to monitor and manipulate the status of peripheral devices and to pass such information to the Operating System software where the actual power management strategy is most appropriately located.

Condition Code Emulation

One of the most time consuming elements of real machine emulation is condition code register simulation. Many historical machines have a highly diverse set of rules for setting exception conditions and a complete emulation of these rules exclusively in microcode has serious performance penalties. Various techniques of pre-scanning object code to determine which condition codes will actually be used, have been tried, but problems of self-modifying code, etc., always arise. For this reason, the IMS-3250B microprocessor has logic which calculates emulated machine condition codes in parallel with instruction execution, to permit high performance emulation of a selected set of real machine environments.

There are 2 sets of 16 condition code calculation strategies implemented within the IMS-3250B, plus one special fault to support MIPS emulation. The RHS instruction AR (Alternate Registers) is used to specify one of the 16 condition code operations for emulated machine condition code emulation. During selected IMS-3250B machine cycles which specifically emulate a current real machine instruction, a special Condition Code Register (CCR) is used to store the condition code bits calculated using the rules for condition code calculation unique to the current real machine. The standard IMS-3250B condition code logic is unaffected by the periodic setting of the CCR.

The CCR is one of the registers available via T and A field references in LHS instructions and thus can be tested for the presence or absence of specific bits. More than one variation of the CCR is implemented. The one selected by the CCR A field, and its format, is determined by the target machine selected in the EMR.

Decode and Dispatch

The IMS-3250B does a complete instruction decode in parallel with the execution of prior emulated machine instructions. Up to three emulated instructions are decoded in advance. The decode logic places emulated instruction register references in three indirect register pointers which point to the set of thirty-two emulation registers, moves immediate data to an immediate register, and calculates the effective address for instruction operands, branches and conditional branches, and determines the microinstruction address at which the instruction emulation will begin when the emulated instruction goes into execution.

Assumptions and limitations

The TLB will support one page size (4K bytes) and 1 initial shift value (8) (bits 31-24 can be replaced by 0's prior to page translation).

The i486 test registers TR3–TR7 are not implemented in hardware. Moves to these registers will apparently work; moves from them will return 0's.

Processor Description

Operand field references:

The assignment of T, A and B operand field references are as follows. Both a binary numeric value and an assembler oriented mnemonic are provided.

'T' field references

There are four sets of interpretations for the values (0-f) in the 'T' field. Set 0 (the 'normal' set) does not require use of a right hand side instruction. The other three sets are selected by using the RHS instructions AR (Alternate Registers) or DD (Decode and Dispatch).

| Set 0 | Selected by no ROp or ROp = AR or DD with Tf = 0 | |
|---|---|---|
| 0 | X | Intermediate result register * |
| 1 | LSR | Link Stack push |
| 2 | CCR | Condition Code Register |
| 3 | WR_1 | Write data, channel 1 |
|   | WR_2 | Write data, channel 2 ** |
|   | WRI_1 | Write data, channel 1, then increment channel ** |
|   | WRI_2 | Write data, channel 2, then increment channel ** |
| 4 | LD_1 | Load address channel 1 |
|   | LD_2 | Load address channel 2 ** |
|   | LDX_1 | Perform faults write tests on channel 1 ** |
|   | LDX_2 | Perform faults write tests on channel 2 ** |
| 5 | LDF_1 | Load address and fetch data channel 1 |
|   | LDF_2 | Load address and fetch data channel 2 ** |
|   | LDFX_1 | Perform read fault tests on channel 1 ** |
|   | LDFX_2 | Perform read fault tests on channel 2 ** |
|   | LDFP_1 | Load address and fetch data channel 1, prepare for write ** |
|   | LDFP_2 | Load address and fetch data channel 2, prepare for write ** |
|   | LDFP_1 | Perform read/write fault tests on channel 1 ** |
|   | LDFP_2 | Perform read/write fault tests on channel 2 ** |
| 6 | LDIS | Load instructions stream address |
| 7 | RI0 | Register indirect reference registers (32 bits) |
| 8-f | R0-R7 | 8 general registers (32 bits) |

Notes:
* The 'X' or result register always takes on the result of the LHS operation. Its contents can be used as an A or B field operand in a subsequent LHS instruction.
** This T field requires the use of the right-hand side AR instruction.

| Set 1 | Selected by ROp = AR or DD with Tf = 1 | |
|---|---|---|
| 0-f | ER0–ER15 | Emulation registers 0 thru 15. |

Set 2 Selected by ROp = AR or DD with Tf = 2

| 0-f | ER16–ER31 | Emulation registers 16 thru 31. |
|---|---|---|

| Set 3 | Selected by ROp = AR or DD with Tf = 3 | |
|---|---|---|
| 0 | unassigned | |
| 1 | RI1 | (ER(15-0) as selected by RI1) |
| 2 | RI2 | (ER(15-0) as selected by RI2) |
| 4 | RI0A = | (ER(15-8) as selected by RI0 or 8) |
| 5 | RI1A = | (ER(15-8) as selected by RI1 or 8) |
| 6 | RI2A = | (ER(15-8) as selected by RI2 or 8) |
| 8 | RI0B = | (ER(3-0) as selected by RI0 and 3), bits 15-8) if RI0 (bit 2) was = 1, else bits (7-0) |
| 9 | RI1B = | (ER(3-0) as selected by RI1 and 3), (bits 15-8) if RI0 (bit 2) was = 1, else bits (7-0) |
| a | RI2B = | (ER(3-0) as selected by RI2 and 3), (bits 15-8) if RI0 (bit 2) was = 1, else bits (7-0) |
| c | RI0L | (RI0 literal value) |
| d | RI1L | (RI1 literal value) |
| e | RI2L | (RI2 literal value) (load the "RI2L" and "RI2S" registers from a byte): |

```
 7  4  3  2  1   0
| reg | !s | scale | x |
| RI2|   RI2s   |
```

Note: RI2L can only be used as a 'T' Field if the machine being emulated is the 68040 (machine = m40 in EMR).
3, 7, b, f unassigned In addition, all the registers addressable thru the RHS instructions SPR (special register) are valid 'T' field assembler mnemonics.

'A' field references

There are four sets of interpretations for the values (0-f) in the 'A' field. Set 0 (the 'normal' set) does not require use of the right hand side instruction. The other three sets are selected by the right hand side instructions AR (Alternate Registers) or DD (Decode and Dispatch).

| Set 0 Selected by no ROp or ROp = AR or DD with Af = 0. | | |
|---|---|---|
| 0 | 0 | (literal zero in A field) (32 bits) |
| 1 | X | Intermediate result register (32 bits) |
| 2 | CCR | Condition Code Register |
| 3 | RD_1 | Read (8, 16 or 32 bits) |
|   | RD_2 | Read (8, 16 or 32 bits)** |
|   | RDI_1 | Read, then increment channel 1 |
|   | RDI_2 | Read, then increment channel 2** |
| 4 | unassigned | |
| 5 | ISP | Instruction stream pointer |
| 6 | CAR_1 | Channel 1 address register |
|   | CAR_2 | Channel 2 address register** |
| 7 | RI1 | Register indirect reference registers (32 bits) |
| 8-f | R0-R7 | 8 general registers (32 bits) |

Set 1 Selected by ROp = AR or DD with Af = 1

| 0-f | ER0–ER15 | Emulation registers 0 thru 15. |
|---|---|---|

Set 2 Selected by ROp = AR or DD with Af = 2

| 0-f | ER16–ER31 | Emulation registers 16 thru 31. |
|---|---|---|

Set 3 Selected by ROp = AR or DD with Af = 3

| 0 | RI0 | (ER(15-0) as selected by RI0) |
|---|---|---|
| 1 | unassigned | |
| 2 | RI2 | (ER(15-0) as selected by RI2) |
| 4 | RI0A = | (ER(15-8) as selected by RI0 or 8) |
| 5 | RI1A = | (ER(15-8) as selected by RI1 or 8) |
| 6 | RI2A = | (ER(15-8) as selected by RI2 or 8) |
| 8 | RI0B = | (ER(3-0) as selected by RI0 and 3), (bits 15-8) if RI0 (bit 2) was = 1, else bits (7-0) |
| 9 | RI1B = | (ER(3-0) as selected by RI1 and 3), (bits |

-continued

|   |       |                                                                                                                                                                                                                    |
|---|-------|--------------------------------------------------------------------------------------------------------------------------------------------------------------------------------------------------------------------------------|
|   |       | 15-8) if RI0 (bit 2) was = 1, else bits (7-0) |
| a | RI2B = | (ER(3-0) as selected by RI2 and 3), (bits 15-8) if RI0 (bit 2) was = 1, else bits (7-0) |
| c | RI0L  | (RI0 literal value (not zero-filled)) |
| d | RI1L  | (RI1 literal value (not zero-filled)) |
| e | RI2L  | (RI2 literal value (not zero-filled)) |
| 3 | unassigned | |
| 7 | 032   | (not zero-filled) |
| b | ISP   | instruction pointer |
| f | SETCC | condition flag for SETCC command |

In addition, all the registers addressable thru the RHS instruction SPR (special register) are valid 'A' field assembler mnemonics.

'B' field references

There are four sets of interpretations for the values (0-f) in the 'B' field. Set 0 (the 'normal' set) does not require use of the right hand side instruction. The other three sets are selected by the right hand side instructions AR (Alternate Registers) or DD (Decode and Dispatch).

Set 0 Selected by no ROp or ROp = AR or DD with Bf = 0.

| 0 | 0 | (literal zero in B field) (32 bits) |
| 1 | 1 | (literal one in B field) (32 bits) |
| 2 |   | literal 16 bit literal (bits 15-0) |
| 3 | X | Intermediate result register (32 bits) |
| 4 | LSR | Link Stack pop (32 bits) |
| 5 | IMMR | Immediate field register (32 bits) |
| 6 | unassigned | |
| 7 | RI2 | Register indirect reference registers (32 bits) |
| 8-f | R0–R7 | 8 general registers (32 bits) |

Set 1 Selected by ROp = AR or DD with Bf = 1

| 0-f | ER0–ER15 | Emulation registers 0 thru 15. Note: ER2 is not available due to b field literals. |

Set 2 Selected by ROp = AR or DD with Bf = 2

| 0-f | ER16–ER31 | Emulation registers 16 thru 31. Note: ER18 is not available due to b field literals. |

Set 3 Selected by ROp = AR or DD with Bf = 3

| 0 | RI0 | (ER(15-0) as selected by RI0) |
| 1 | RI1 | (ER(15-0) as selected by RI1) |
| 2 | not available | |
| 4 | RI0A = | (ER(15-8) as selected by RI0 or 8) |
| 5 | RI1A = | (ER(15-8) as selected by RI1 or 8) |
| 6 | RI2A = | (ER(15-8) as selected by RI2 or 8) |
| 8 | RI0B = | (ER(3-0) as selected by RI0 and 3), (bits 15-8) if RI0 (bit 2) was = 1, else bits (7-0) |
| 9 | RI1B = | (ER(3-0) as selected by RI1 and 3), (bits 15-8) if RI0 (bit 2) was = 1, else bits (7-0) |
| a | RI2B = | (ER(3-0) as selected by RI2 and 3), (bits 15-8) if RI0 (bit 2) was = 1, else bits (7-0) |
| c | RI0L | (literal value) |
| d | RI1L | (literal value) |
| e | RI2L | (literal value) |
| 3 | unassigned | |
| 7 | OPSIZE | 032 bit times 2 + 2. |
| b | SELR | selector register |
| f | RI0L8 | RI0L if RI0L = 1,7; 8 if RI0L = 0 (not zero-filled) |

Note: RI2S is selected with a width of 8 (Ar = A8) or 16 (Ar = A16) to specify the bit to be sign extended (7 or 15). The width of the operation, however, is always 32 bits (the result is 32 bits wide and the 'A' field selected is 32 bits wide).

Inferred 'X' register

It is possible that the last cycle of the emulation of one real instruction could store a result in an emulated register, and the first cycle of the emulation of the next real instruction could use this result. In order for this code sequence to work correctly, the emulation of the second instruction would have to begin with a 'NOP' to allow the result to be stored; but this would be a wasted cycle if the prior instruction did not end with a store, or the register used by the second instruction were different. To resolve this difficulty the 3250B will notice if the 'T' field of the instruction immediately following an instruction with a DD0 ROp (the last microinstruction of one emulated instruction) references an emulation register (ER0–ER31) and is the same as the 'A' or 'B' field reference of the next instruction. If so the 'X' register will be used as the A and/or B register.

'LOp' Field References

'LOp' field references (binary operations) The following instruction supports general purpose two's complement 32×33 bit multiplication:

| 0 | * | c(A) * c(B). Three versions of the operation are available. 32 * 32 bit signed, 33 * 32 bit unsigned, with the 33rd bit forced to 0 or 1. The 32-bit multiplicand A, with a 33rd bit (high) set or reset, is multiplied by the 32-bit multiplier B. The most significant half of the result is stored in a reserved register MMSW, and least significant half of the result is stored at the T field. Overflow is set to reflect whether the MSW is significant (see AR instruction for how to specify which operation is required). The default is signed (does not use right hand side operation unless setting condition codes is required). |

The following instruction provides for arithmetic right shifts of (0–31) positions. Vacated bit positions from the left are replaced with the original bit 31 of c(A). The encoding of the B field, the source of the shift count, is modified as follows:

| B = | 0 | literal, Address field(4-0) note: Inhibits RHS instructions. |
| =   | 1 | literal, = 1 |
| =   | 2 | literal, = 2 |
| =   | 3 | literal, = 3 |
| =   | 4 | literal, = 4 |
| =   | 5 | literal, = 5 |
| =   | 6 | literal, = 6 |
| =   | 7 | literal, = 7 |
| B = | 8-f | R0–R7, general registers bits(4-0) |
| 1   | SRA | c(A) shifted right arithmetic B bits with bit 31 of c(A) replacing vacated bits |

The following are double register versions of the logical left and logical right shift instructions. The B field may specify one of the general registers (R0–R7) only. The B field (bit 3) is used to indicate the direction of the shift (0=left, 1=right). The T field receives the left most 32 bits of the result after a left shift, and the right most 32 bits of the result after a right shift.

| 2 | SLLD | c(A),c(B) shift left logical by Addr(4-0) |
| 2 | SRLD | c(A),c(B) shift right logical by Addr(4-0) note: SLLD/SRLD inhibit |

| | | RHS instructions. |
|---|---|---|
| 3 | SLLDX | c(A),c(B) shifted left logical by X(4-0). |
| 3 | SRLDX | c(A),c(B) shifted right logical by X(4-0). |

The following two instructions provide for logical left/right shifts of (0–31) positions. Vacated bit positions from the left or right are replaced with zeros. The encoding of the B field, the source of the shift count, is modified as described for SRA. The overflow condition is set if any 1 bit is shifted out of the A register.

| 4 | SLL | c(A) shifted left logical B bits |
|---|---|---|
| 5 | SRL | c(A) shifted right logical B bits |

The following two instruction provide for rotational left/right shifts of (0–31) positions. The encoding of the B field, the source of the shift count, is modified as described for SRA. The overflow condition is set if the last bit shifted out of the A register is 1.

| 6 | SLR | c(A) shifted left rotational B bits |
|---|---|---|
| 7 | SRR | c(A) shifted right rotational B bits |

The following instruction supports general purpose two's complement 32-bit addition. A number of variations of the basic 32-bit format are provided in support of multi-precision addition.

| 8 | + | c(A) + c(b), A + B twos complement arithmetic<br>note: overflow (ov) set if A + B > 32 bits |
|---|---|---|
| 8 | +O | c(A) + c(B) + 1, A + B + 1<br>note: overflow (OV) set if A + B + 1 > 32 bits.<br>note: this form uses the RHs instruction AM. |
| 8 | +C | c(A) + c(B) + ov, A + B + (prior arithmetic overflow bit)<br>note: overflow (ov) set if A + B + ov > 32 bits.<br>note: this form uses the RHS instruction AM. |
| 8 | +EC | c(A) + c(B) + C bit in CCR<br>note: overflow (ov) set if A + B + C > 32 bits.<br>note: this form uses the RHS instruction AM. |
| 8 | +EX | c(A) + c(B) + X bit in CCR<br>note: overflow (ov) set if A + B + C > 32 bits.<br>note: this form uses the RHS instruction AM. |

The overflow bit (ov) is set to the arithmetic overflow (output from the ALU) on every cycle except: 1) on multiple (*) it is set to the multiply overflow, and 2) on shifts or sign extension instructions it is unchanged.

The following three instructions provide 32-bit wide logical manipulation of variables:

| 9 | XOR | c(A) XOR c(B) |
|---|---|---|
| a | OR | c(A) OR c(B) |
| b | AND | c(A) AND c(B) |

The following instruction supports general purpose two's complement 32-bit subtraction. A number of variations of the basic 32-bit format are provided in support of multi-precision subtraction:

| c | – | c(A) – c(b), A – B twos complement arithmetic<br>note: overflow (ov) set if A + compb + 1 > 32 bits. |
|---|---|---|
| c | –O | c(A) – c(B) – 1, A – B – 1<br>note: this form uses the RHS instruction AR. |
| c | –C | c(A) – c(B) – ov, A – B – (prior arithmetic borrow = !overflow bit).<br>note: this form uses the RHS instruction AR. |
| c | –EC | c(A) – c(B) – C bit in CCR<br>note: this form uses the RHS instruction AR. |
| c | –EX | c(A) – c(B) – X bit in CCR<br>note: this form uses the RHS instruction AR. |
| c | –+ | c(B0 – c(A)<br>note: this form uses the RHS instruction AR. |

The following instructions are the bit manipulation instructions. The B field is used to specify the type of operation (bits 3-0).

| | | B-field |
|---|---|---|
| d | BS | 0000 byte swap c(A). The result becomes c(A) (7-0), c(A) (15-8), c(A) (23-16), c(A) (31-24). |
| d | SEB | 0001 sign extend bit 7 of c(A). |
| d | SEH | 0010 sign extend bit 15 of c(A). |
| d | SEOS | 0011 sign extend bit 15 if OS = 0. |
| d | ZFB | 0101 zero fill bits 31-8 of c(A). |
| d | ZFH | 0110 zero fill bits 31-16 of c(A). |
| d | SEAS | 0111 sign extend bit 15 is OS = 0. |
| d | OFB | 1001 one fill bits 31-8 of c(A). |
| d | OFH | 1010 one fill bits 31-16 of c(A). |
| d | SESC | 1011 sign extend and scale c(A) according to RI2S |
| d | CHGS | 1100 change sign (bit 31) of C(A). |
| d | CLRS | 1101 clear sign (bit 31) of C(A). |
| d | SETS | 1110 set sign (bit 31) of C(A). |
| d | CLB | 1111 count leading replications of bit 31 of c(A) in c(A) (30-0). The count is returned in bits 4-0, bit 31 of c(A) is returned in bit 6. |

```
 6    4      0
|s|   | count |
```

The following instruction is a highly specialized multiway transfer or branch instruction designed to examine a data field and in a single clock cycle transfer to 1 of 'n' code sequences depending upon the value of the data field. This instruction is a special case of the unconditional transfer instruction.

| e | DISP | c(A) dispatched |
|---|---|---|

Typical instruction format:

c(T):=c(A) DISP M N Transfer address

The 'A' field may have the following sources as specified by bits 3-2 of the 'A' field:

00 - RI0L(3-0) (RI0L)
01 - RI1L(3-0) (RI1L)
10 - The A register (5-0) from previous instruction (AR)
10 - The A register (5-0) from previous instruction (AR)
11 - one of 16 1 or 2-bit dispatch sources as -continued specified by bits 3-0 of the 'B' field (also
controlled by the machine being emulated
('machine' bit in EMR)).

| 'B' | i486 | m40 |
|---|---|---|
| 0000 | R0 bit 0 (R0) | = |
| 0001 | R7 bit 0 (R7) | = |
| 0010 | R7 bits 14-0 (FEXP7) (2 bit) | = |
| 0011 | R6 bits 14-0 (FEXP6) (2 bit) | = |
| 0100 | REP (REP) | LUN1 (2 bit) |
| 0101 | REP (REPN) (2 bit) | |
| 0110 | O32 (O32) | A(11)A(5) (A115) (2 bit) |
| 0111-1111 | unassigned | |

M = Mask width (i.e., 1 to 8 bits for B = 0 to 7)
(bits 2-0 of B) (assumed 1 or 2 for 1 or 2-bit
dispatches)
N = Field multiplier (i.e., 0 = 1, 1 = 2, 2 = 4, 3 =
8) (bits 1-0 of A)

| 31 28 | 27 26 | 25 24 | 23 20 | 19 18 | 16 15 | 0 |
|---|---|---|---|---|---|---|
| T | A | N | op=E | B | B/M | address |

Operation:
Bits ((M-1)-0) of c(A), after being shifted left 'N',
places are added to the Address field bits 15-0 and an
unconditional transfer is taken.
Notes:
1. DISP uses a full 16-bit address field for the
dispatch vector address, but the entire vector must be
contained within a single page.
2. FEXPn dispatch to + 8 if the exponents is all 1's, +
4 if all 0's, + 0 otherwise.

The RHS instruction is redefined.
The following instruction uses the B field as a secondary operation code. All operation codes in this category are unary and do not require the B field to specify a second argument.

f BF

'LOp' field references (unary operations)
The following 8 instructions increment or decrement the contents of the 'A' register.

| LOp = f,b = 0 INC4 | 'A' + 4 |
|---|---|
| LOp = f,b = 1 DEC4 | 'A' − 4 |
| LOp = f,b = 2 INC | 'A' + 1 |
| LOp = f,b = 3 DEC | 'A' − 1 |
| LOp = f,b = 4 INC2 | 'A' + 2 |
| LOp = f,b = 5 DEC2 | 'A' − 2 |
| LOp = f,b = 6 INC3 | 'A' + 3 |
| LOp = f,b = 7 DEC3 | 'A' − 3 |

The following instruction is unassigned:

LOp=f,b=8 unassigned

The following instruction reproduces the low order half-word in both halfwords of c(A), if O32=0,

| LOp = f,b = 9 FILLOS | fill c(A) with the low order 16 bits of c(A), if OS = 0. The result becomes: c(A)(15-0), c(A)(15-0). If OS = 1 the result is c(A). |
|---|---|

The following instruction reproduces the low order byte in all bytes of c(A):

| LOp = f,b = a FILLB | fill c(A) with the low order bits of c(A). The result becomes: c(A)(7-0), c(A)(7-0), c(A)(7-0), c(A)(7-0). |
|---|---|

The following instruction reproduces the low order half-word in both halfwords of c(A):

| LOp = f,b = b FILLH | fill c(A) with the low order bits of c(A). The result becomes: c(A)(15-0), c(A)(15-0). |
|---|---|

The following instruction returns a special dispatch value for m40 emulation:

| Lop = f,b = c | LUN1 result = 1 if c(A) bits 7-0 = x'00', = 2 if c(A) bits 7-0 = X'FF', = 0 otherwise. |
|---|---|

The following instruction selects one of several miscellaneous instructions including floating point operation support, fast Fourier support, and segment loading support. These instruction all require the right-hand side of the instruction for the sub-opcode:

| LOp = f,B = d | miscellaneous instructions. Address (3-0) specify the operation. Some of these operations are not unary. They specify the b register (a general register only) in Addr (6-4). |
|---|---|
| (3-0) | opcode definition |

The following instruction support floating point operations:

| 0 | FEXX32 | Extract 32-bit exponent from c(A). |
|---|---|---|
| 1 | FEXX64 | Extract 64-bit exponent from c(A). |
| 2 | FEXX80 | Extract 80-bit exponent from c(A). |
| 3 | FEXF32 | Extract 32-bit fraction from c(A). |
| 4 | FEXF64 | Extract 64-bit fraction from c(A), C(B). |
| 5 | SR1S | Shift c(A) right 1 and set sign. |
| 6 | SR1C | Shift c(A) right 1 and insert carry. |
| 7 | RSEED | generate reciprocal seed from c(A). |

The following instruction supports fast Fourier transforms:

| 8 | BITREV | returns the right most n bits of c(a), in reverse, right-adjusted, with bits (31 − n) cleared. n is stored in c(B). |
|---|---|---|

The following three operations are used to extract base and extent registers from an a segment descriptor loaded into the a and b registers. The overflow fault is generated if any error condition occurs:

| | | |
|---|---|---|
| d | BASE | generate base register from c(A), c(B) |
| e | EXTENT | generate extent register fro c(A), c(B) |
| f | BEFLT | return faults from base extent generation |

These operations are described here:
The register pair contain:

c(A):

```
    31         16 15        0
   |BASE(15:0) | LIM(15:0)  |
``` c(B):
```
 31      24 23  20 19     16 15       8 7          0
|BASE(31:24)|G|D|r|a|LIM(19:16)|P|PL|1|E|DT|A|BASE(23:16)|
```

For BASE the result is:

```
 31        24 23         16 15         0
|BASE(31:24)|BASE(23:16)|BASE(15:0)|
```

For EXTENT the result is:

```
 27      24 23          8 7 5 4 3 2 1 0
|LIM(19:16)|LIM(15:0)   |P|L|G|D|E|x|a|P|
``` where:
$$x = DT[1] \text{ if } E = 0, \text{ else } 0$$
$$a = DT[0]$$

Overflow is set on either instruction if:
CD=not code or data segment: odd[12]<>1
NP=not present: P=0
PL=privilege level: PL<CPL in mode register
For BEFLT the result is:

```
  2   1   0
|PL|NP|CD|
```

The following two instructions are special case versions of the RHS LINK and TRAnsfer instructions. The standard RHS versions are limited by the fact that the Address field is a maximum of twelve bits to transfers within a single page (4K words) of the instruction memory. The following instructions provide for unbounded transfers within the entire address space of the IMS-3250. This feature is efficient for linking to a common set of math routines from a multi-linguistic emulation environment.

| | | |
|---|---|---|
| LOp = f,b = e LINKL | | LINK Long to the address composed of instruction bits 15-0. |
| LOp = f,b = f TRAL | | TRAnsfer Long to the address composed of instruction bits 15-0. |

'ROp' field references

Right hand side instructions, depending upon the specific operation code, are executed either in Phase II, III or IV of the processor pipeline. In general:

1) Unconditional transfer of control is executed in Phase II,
2) Assignment statements become effective at the transition between Phase II and III,
3) Conditional transfer of control is executed in Phase IV, and
4) External bus operations are initiated in Phase IV.

When the ROp field is present, i.e., B~=2, the ROp field is the operation code of the right hand side (RHS) instruction component. An exception exists for the DISP instruction, and a few others, for which the value of the ROp field is redefined.

'ROp' field references (12 bit addresses):

The following instruction is an ROp field extension instruction in which the Address field, bits 11-8 act as an extension of the RHS operation code field. This extends the RHS opcode count to a total of 31 operation codes. All operation codes in this category require eight or fewer bits of operand.

0ROpE

The following three RHS instructions, in conjunction with a companion LHS instruction, are the primary vehicle for real machine emulation. Each of the machines to be emulated may have special or unique considerations for operand addition or subtraction and condition code settings for example. These special or unique features cannot be emulated exclusively in a sequence of IMS-3250B instructions without potential serious consequences in overall emulator performance (effective MIP rates). These RHS instructions establish a mechanism by which the basic processor of the IMS-3250B can be modified during an individual clock cycle to match the characteristics of the particular real machine being emulated.

The following instruction is the primary decode and dispatch instruction. It specifies which of the two dispatches to perform, along with various options. It also can redefine the meaning of the 'T', 'A' and 'B' fields

| | | |
|---|---|---|
| 1 | DD | Decode/Dispatch |

```
 11  10  9  8-7  6-5  4-3  2-0
| n | r | i | Tf | Af | Bf | Wd |
``` where:
n = 0, DD0 (DD0)
 r = 0, reset
   = 1, don't reset (NR)
 i = 0, permitt interrupts
   = 1, ignore interrupts (NI)
 = 1,
 ri = 00, DD1 (DD1)
    = 01, DD (no decode/dispatch)
    = 10, unassigned
    = 11, unassigned
Tf = 0, Use normal T field register definitions
   = 1 Redefine T field to set 1.
   = 3 Redefine T field to set 2.
Af = 0, Use normal A field register definitions
   = 1 Redefine A field to set 1.
   = 3 Redefine A field to set 2.
Bf = 0, Use normal B field register definitions
   = 1 Redefine B field to set 1.
   = 3 Redefine B field to set 2.
Wd = arithmetic width
   = 000, 8 bits (B)
   = 001, 16 bits (H)
   - 010, 32 bits (W)
   = 011, unassigned
   = 100, operand size (OS)
       O32 = 0 -> H, else W
   = 101, address size (AS)
       W = 0 -> H, else W
   = 110, stack size (SS)
       s32 = 0 -> H, else W
   = 111, unassigned Notes:
1) The Wd field determines the width of the store of the corresponding lefft hand operation. For the emulation registers ER15-ER0, the Wd low bits are inserted and the high order bits are not changed (note: a low byte can be inserted into ER7-ER0 only). For other registers, Wd bits are stored into the X register with the high order bits zero filled, and subsequently into any other general register. The value of the X-register used in a subsequent instruction will not be zero filled, however.

2) The Wd field also affects the width of values fetched for the A field of B field register if it is a general register (R0–R7), an emulation register (ER0–ER15) or a memory register (MR_0–15 or MRH_0–15). In these cases the value is zero filled. In all other cases the Wd field has no effect on the fetch.

3) The width field is ignored on argument fetching and storing on double register shifts.

On DD0 (unless NR is specified), at the end of phase III of the DD0 instruction, prior to the transfer of control, a 'reset' is performed (see DD0 reset and timing).

Prior to the transfer to the DD0 address (unless NI is specified), and prior to the reset, any interrupts are honored by a transfer to location 0.

The following RHS instruction is used when it is desired to set the emulated condition code register (CCR):

| 12-9 | 8-7 | 6-5 | 4-3 | 2-0 |
|------|-----|-----|-----|-----|
| CC | Tf | Af | Bf | Wd | where:

CC selects one of 16 condition code calculation strategies.

The other fields are the same as in the DD instruction.

Setting of the condition code bits is determined as follows. In the EMR one of three sets of condition code operations is selected by the machine bits. One of the sixteen condition code operations within the selected set is specified by the CC field of the AR RHS instruction. The other factor in setting condition codes is the width of the arithmetic being performed (32, 16 or 8 bits as selected by Wd).

For various special instructions the CCop field of the AR instruction is used to redefine or qualify the LHS instruction.

If the LHS instruction T field is a LD_n, LDF_n, LDFP_n or WR_n, or the A field is RD_n or RDI_n, the CCop field gets the following interpretation:

| 12 | 11 | 10 | 9 |
|----|----|----|---|
| X | P | I | C | where:
X = 1, LDX, LDFX or LDFPX
P = 1, LDFP
I = 1, increment channel after read or write
C = 0, channel 1
  = 1, channel 2

If the LOp is a multiply operation, the CC field gets the following interpretation:

| 12 | 11 | 10 | 9 |
|----|----|----|---|
| 32 | C | S | H | where:
32 = 1, result is 32 bits (MUL32)
  0, result is 64 bits (MUL)
C = 1, calculate multiply condition codes,
  = 0, don't change condition codes.
S = 0, signed multiplication,
  = 1, unsigned multiplication.
H = high order (33rd) bit the multiplicand.

If the LOp is + or −, the CC field gets the following interpretation:

| 12 | 11 | 10 | 9 |
|----|----|----|---|
| subop | | CCop | | where:
CCop specifies the condition code operation as follows:

| +/− | CCop | Condition code operation |
|-----|------|--------------------------|
| + | 00 | LOG (0) |
| + | 01 | ADD (1_ |
| + | 10 | INC (2) |
| + | 11 | no condition codes set |
| − | 00 | LOG (0) |
| − | 01 | SUB (3) |
| − | 10 | DEC (4) if i486 mode |
| − | 10 | CMP (5) if m40 mode |
| − | 11 | no condition codes set | supop =
11, ordinary +/−
01, +EC/−EC or +EX/−EX according to m40
10, reverse subtraction
11, reinterpret CCop as:
CCop =
  00, +C/−C, set condition codes using ADD/SUB
  01, +O/−O, set condition codes using ADD/SUB
  10, +C/−C, do not set condition codes
  11, +O/−O, do not set condition codes The following instruction is a general purpose single or multiple instruction SKIP instruction:

4 SKIP Skips 1 thru 4 subsequent instruction conditionally
1) depending upon the condition status bits of the LHS portion of the current instruction and the value of the condition mask field (bits 7–0 of the Address field) or;
2) depending upon the result (bits 7–0 of the X register) of the LHS portion of the current instruction and the value of the mask field (bits 7–0 of the Address field).

The Address field is encoded as follows:

| 11–10 | 9–8 | 7 ------ 0 |
|-------|-----|------------|
| S | SOp | Mask | where:
'S' skip count minus 1
'SOp' = 0 Skip if status 'is'
  = 1 Skip if status 'has'
  = 2 Skip if status 'is'
  = 3 Skip if status 'has'
'Mask' 'is' True if for each one bit of the mask a corresponding one bit exists in the argument
  'has' True if for any one bit of the mask a corresponding one bit exists in the argument The mask bits are:

| 7 | 6 | 5 | 4 | 3 | 2 | 1 | 0 |
|---|---|---|---|---|---|---|---|
| HB | NHB | NZ | Z | LB | NLB | OV | NOV |

The following instruction is used set various fields in the channel parameter register (CPR):

5 SCH Set channel parameters.

The address is encoded:

```
     8   7    6 4   3 2   0
   | c | notlb | wd | iso | seg |
``` where:
- c = 0, channel 1
  = 1, channel 2
- notlb = 0, normal TLB operation
  = 1, do not use TLB (NOTLB)
- wd = channel width as specified by the ADR fields:
  - 00 = 8 bit   (B)
  - 01 = 16 bit  (H)
  - 10 = 32 bit  (W)
  - 11 = unassigned
  - 100 = OS  (OS)  (O32 = 0 -> 16; 1 -> 32)
  - 101 = AS  (AS)  (A32 = 0 -> 16; 1 -> 32)
  - 110 = SS  (SS)  (S32 - 0 -> 16; 1 -> 32)
  - 111 = no change (W7)
- iso = ignore segment over-ride (ISO)
- Seg = 0–5, the segment register set # to be associated with the channel. (ES, CS, SS, DS, FS, GS)
  = 6, 0's (NUL)
  = 7, do not change Segn (S7)

The following two instructions provide for unconditional transfer of program control. Because they are unconditional, they can be executed in Phase II of the processor four stage pipeline.

| | | |
|---|---|---|
| 6 | LINK | Unconditional transfer to Address field with return address pushed to LSR |
| 7 | TRA | Unconditional transfer to Address |

The following eight instructions provide for testing and transfer of program control of the eight status bits generated as a result of the execution of the accompanying LHS instruction:

| | | |
|---|---|---|
| 8 | TRA on NOV | Conditional transfer to Address field if overflow (OV) status bit is not set |
| 9 | TRA on OV | Conditional transfer to Address field if overflow (OV) status bit is set |
| a | TRA on NLB | Conditional transfer to Address field if lowbit (LB), bit 0, status bit is not set |
| b | TRA on LB | Conditional transfer to Address field if lowbit (LB), bit 0, status bit is set |
| c | TRA on Z | Conditional transfer to Address field if zero (Z), status bit is set. (result 31-0 = 0) |
| d | TRA on NZ | Conditional transfer to Address field if zero (NZ), status bit is not set. (result 31-0 -= 0) |
| e | TRA on NHB | Conditional transfer to Address field if highbit (HB), bit 31, status bit is not set |
| f | TRA on HB | Conditional transfer to Address field if highbit (HB), bit 31, status bit is set |

'ROp' instructions (8 bit address)
The following operation code is a no operation:

0,0 ROpE,NOP No Operation

The following instruction is used to implement communications and data transfers on the IMS External Bus (EB) to/from a host PCAT clone, which serves as a hardware and software development system. The instruction initiates operations on the External Bus of the processor. Once initiated, operations on the External Bus operate asynchronously, in parallel with continued instruction execution of the processor. The EB is 32 bits wide. Data transfers on the EB involves a source (RECeive from) and a destination (EMIT to). The address of the source (2 bits) and the address of the destination (2 bits) are separate address busses associated with the EB. Two types of data transfers are possible on the bus, namely:

| | | |
|---|---|---|
| 1) EMIT | Processor (source) -> Subsystem (destination) | |
| 2) REC | Subsystem (source) -> Processor (destination) | |
| BUS EMIT dest REC source | | |
| BUS EMIT | specifies | Processor -> Subsystem, |
| BUS REC | specifies | Subsystem -> Processor, and |
| BUS EMIT .. REC specifies | | Processor -> SubsystemA folowed by SubsystemB -> Processor |

0,1 ROpE,BUS  External Bus I/O.

```
    5    4 3   2 1   0
  | R | E | src | dst |
``` where:
- R = 1 -> recieve
- E = 1 -> emit
- source = source address
- dest = destination address The following instruction causes a jump to the pre-calculated conditional jump address:

0,2 ROpE,a JMPEA Jump to effective address

The following instruction specifies that the next unconditional transfer will permit the specified interrupts to cause a transfer to 0:

0,3 ROpE,TRINT    address field
where the address field is:

```
   5   4   3 2   1 0
 | F | X1 | X0 | T | DR | A |
```

The following instruction is used to store into and read from a variety of sets of special purpose registers:

0,4 ROpE,SPR the "T" field and/or the "A" field specify special registers which are to be accessed or stored. The address field bits used are:

```
       4 3 2   0
     | t | a | set |
``` where:
- t = 0, normal "T" field interpretation
  1, "T" field is a special register.
- a = 0, normal "A" field interpretation
  1, "A" field is a special register.
- set = the register set number.

The register sets and permissible values for the "T" and "A" fields for special registers are:

| set | regno | T/A | NZF |
|---|---|---|---|
| 0 | Control | | |
| | 0, 8 = EMR | T/A | NZF |
| | 1, 9 = MR | T/A | NZF |
| | 2, a = IR | T/A | NZF |
| | *3, b = FR | T/A | NZF |
| | 4, c = IMR | T/A | NZF |

| set | regno | T/A | NZF |
|---|---|---|---|
| | 5, d = DBR_0/LDSPA | T/A | |
| | 6–7, e–f = ; DBR_1/EIR | T/A | |
| 1 | TLB | | |
| | *0 = TLBI | T | |
| | 1 = TLBLOG | T | |
| | 2 = TLBPHS | T | |
| 2 | unassigned | | |
| 3 | Debug, TTR & Floating Point | | |
| | 0–3 = DR_n(0–3) | T/A | |
| | 4 = DCR | T | |
| | 8 = TTRD_0 | T | |
| | 9 = TTRD_1 | T | |
| | a = TTRI_0 | T | |
| | b = TTRI_1 | T | |
| | 4–f = 0 | A | |
| 4 | Channel | | |
| | 0–5 = CER_n (0–5) | T (CER) | |
| | 8–d = CBR_n (0–5) | T (CBR) | |
| | 0–5 = active CER | A | |
| | 6 = CPR_1 | A | NZF |
| | 7 = CPR_2 | A | NZF |
| | 8–d = active CBR | A | |
| | e = initial extension value (CERX) | | |
| | *f = CSR | A | NZF |
| 5 | Floating Point Registers | | |
| | 0–7 = FEXP_n (0–7) | T/A | |
| | 8 = FSTK | T/A | |
| | 9 = FEXP | T/A | |
| | a = FMSW | T/A | |
| | b = FLSW | T/A | |
| | c = MMSW | A | |
| | d–f = 0 | A | |
| 6 | 16 bit memory | | |
| | 0–f MRH_n (0–15) | T/A | |
| 7 | 32 bit memory | | |
| | 0–f MR_n (0–15) | T/A | |

Notes:
1: NZF is not zero filled (left bits are undefined)
2: The TLBLOG and TLBPHS registers are accessed as arrays by using the TLBI register as an index.
3: The TLBI is returned in bits 31–27 of the FR.
4: The floating point registers are accessed as an array by using FSTK as an index.
5: "Storing" into FR clears it.
6: CSR(4-0) are cleared by reading the CSR.
7: The CPR register is returned in bits (30–16), the CSR in bits (7-0)
8: CERX = X'FFFFCA' for V86 mode CS segment
 = X'FFFFC2' for V86 mode other segment
 = X'FFFF0A' for real mode CS segment
 = X'FFFF02' for real mode other segment The following instruction unconditionally returns from a subroutine (entered via the LINK instruction) to the top of stack address (LSR–popped)+the address field bits (7-0):

0,5 ROpE,RETURN Return

The following two instructions controls the clock frequency of the IMS-3250, and therefore the rate of power consumption. The bits 2-0 of the address field of the SCF instruction determine a count-down count for actual clock pulses between effective clock pulses. Bit 3 can disable the count down process. When an interrupt occurs the count down process is automatically disabled to allow interrupt code to run at full clock frequency. The interrupt code can revert to the reduced effective clock frequency by executing the RCF instruction.

0,6 ROpE,SCF  Set clock frequency. The address field has the format:

```
  3 2   0
| D | N |
``` where:

D = 0 - disable count down process
    1 - enable count down process
N = 0 - count down of 2
    1 - count down of 4
    2 - count down of 8
    3 - count down of 16
    4 - count down of 32
    5 - count down of 64
    6 - count down of 128
    7 - stop the 3250
0,7 ROpE,RCF  Restore clock frequency.
0,8 ROpE,REEA  recalculate effective address
The following instructions are unassigned:
0.9–f        unassigned Condition Codes
  The following definitions apply:
  'R' is the result register
  'A' is the primary operand
  'B' is the secondary operand
  'm' is the width of the arithmetic—1, i.e., 31, 15 or 7 bits
  The condition code register contains the following emulated condition codes:

for the m40:
  X    special condition code
  N    negative
  V    overflow
  Z    zero
  C    carry
for the i486:
  P    parity
  A    auxiliary
  S    sign
  O    overflow
  Z'   zero
  C'   carry If the machine selected by the EMR is m40, the CCR is returned as:

```
 31 16 15 12 11 10  8 7 6 5 4 3 2 1 0
|  0  | x |  0 | x  | 0 0 0 X N Z V C |
```

If the machine selected by the EMR is i486, the CCR is returned and stored as:

```
 31  22 21 16 15     11    7 6  5 4 3 2 1 0
|  0  | x | 0 x x x 0 x x x S Z'| 0 A 0 P 1 C'|
``` where:
  0 = returned as 0
  1 = returned as 1
  x = returned as stored. The x bits are not affected by condition code logic.

If the machine selected by the EMR is MIPS, there are no condition codes calculated, but any add or subtract LHS instruction with a AR RHS instruction which requests that condition codes be set (any CC op) can cause an overflow exception (interrupt 8)/.
Condition Codes Calculations
  The following are the definitions for the calculation of the bits of the CCR based on the condition code operation in bits 12-9 of the AR ROp:

CC = 000, logical (LOG)
  Z,  R(m thru o) = 0
  Z'  R(m thru 0) = 0

```
        N   R(m)
        S   R(m)
        V   0
        O   0
        C   0
        C'  0
        X   not affected
        P   Even parity on R(7-0)
        A   ? (don't care)
CC = 0001, + (ADD)
        Z   R(m thru 0) = 0
        Z'  R(m thru 0) = 0
        N   R(m)
        S   R(m)
        V   B(m) & A(m) & !R(m) | !B(m) & !A(m) & R(m)
        O   B(m) & A(m) & !R(m) | !B(m) & !A(m) & R(m)
        C   carry out of R(m)
        C'  carry out of R(m)
        X   C
        P   Even parity on R(7-0)
        A   carry out of R(3)
CC = 0010, bit (BIT, INC)
        Z   R(0) = 0
        Z'  R(m thru 0) = 0
        N   not affected
        S   R(m)
        V   not affected
        O   B(m) & A(m) & !R(m) | !B(m) & !A(m) & R(m)
        C   not affected
        C'  not affected
        X   not affected
        P   Even parity on R(7-0)
        A   carry out of R(3)
CC = 0011, - (SUB)
        Z   R(m thru 0) = 0
        Z'  R(m thru 0) = 0
        N   R(m)
        S   R(m)
        V   !B(m) & A(m) & !R(m) | B(m) & !A(m) & R(m)
        O   !B(m) & A(m) & !R(m) | B(m) & !A(m) & R(m)
        C   !carry out of R(m)
        C'  !carry out of R(m)
        X   C
        P   Even partiy on R(7-0)
        A   !carry out of R(3)
CC = 0100, (DEC)
        Z   ?
        Z'  R(m thru 0) = 0
        N   ?
        S   R(m)
        V   ?
        O   !B(m) & A(m) & !R(m) | B(m) & A!A(m) & R(m)
        C   ?
        C'  not affected
        X   ?
        P   Even parity on R(7-0)
        A   !carry out of R(3)
CC = 0101, compare (CMP)
        Z   R(m thru 0) = 0
        Z'  R(m thru 0) = 0
        N   R(m)
        S   R(m)
        V   !B(m) & A(m) & !R(m) | B(m) & !A(m) & R(m)
        O   !B(m) & A(m) & !R(m) | B(m) & !A(m) & R(m)
        C   !carry out of R(m)
        C'  !carry out of R(m)
        X   not affected
        P   Even parity on R(7-0)
        A   !carry out of R(3)
CC = 0110, shift left logical (SLL) (see notes)
        Z   R(m thru 0) = 0
        Z'  R(m thru 0) = 0 (not affected if count = 0)
        N   R(m)
        S   R(m) (not affected if count = 0)
        V   0
        O   R(m) != C' (not affected if count = 0)
        C   R(m+1) (last bit shifted out) (0 if count = 0)
        C'  R(m+1) (last bit shifted out) (not affected if count = )
        X   R(m+1) (last bit shifted out) (not affected if count = 0)
        P   Even parity on R(7-0) (not affected if count = 0)
        A   ? (not affected if count = 0)
CC = 0111, shift right logical (SRL) (see notes)
        Z   R(m thru 0) = 0
        Z'  R(m thru 0) = 0 (not affected if count = 0)
        N   R(m)
        S   R(m) (not affected if count = 0)
        V   0
        O   R(m-1) (not affected if count = 0)
        C   R(-1) (last bit shifted out) (0 if count = 0)
        C'  R(-1) (last bit shifted out) (not affected if count = 0)
        X   R(-1) (last bit shifted out) (not affected if count = 0)
        P   Even parity on R(7-0) (not affected if count = 0)
        A   ? (not affected if count = 0)
CC = 1000, shift left rotational (SLR, ROL) (see notes)
        Z   R(m thru 0) = 0
        Z'  not affected
        N   R(m)
        S   not affected
        V   0
        O   R(m) != C' (not affected if count = 0)
        C   R(m+1) (last bit shifted out) (0 if count = 0)
        C'  R(m+1) (last bit shifted out) (not affected if count = 0)
        X   not affected
        P   not affected
        A   not affected
CC = 1001, shift right rotational (SRR, ROR) (see notes)
        Z   R(m thru 0) = 0
        Z'  not affected
        N   R(m)
        S   not affected
        V   0
        O   R(m) != R(m-1) (not affected if count = 0)
        C   R(-1) (last bit shifted out) (0 if count = 0)
        C'  R(-1) (last bit shifted out) (not affected if count = 0)
        X   not affected
        P   not affected
        A   not affected
CC = 1010, rotate left thru carry (RCL) (see notes)
        Z   ?
        Z'  not affected
        N   ?
        S   not affected
        V   ?
        O   R(m) != C' (not affected if count = 0)
            (uses previous C', set by LSCF)
        C   ?
        C'  not affected, (use LSCF prior to RCL)
        X   ?
        P   not affected
        A   not affected
CC = 1011, rotate right thru carry (RCR) (see notes)
        Z   ?
        Z'  not affected
        N   ?
        S   not affected
        V   ?
        O   R(m) != R(m-1) (not affected if count = 0)
        C   ?
        C'  not affected, use LSCF prior to RCR)
        X   ?
        P   not affected
        A   not affected
CC = 1100, shift right arithmetic (SRA) (see notes)
        Z   R(m thru 0) = 0
        Z'  R(m thru 0) = 0 (not affected if count = 0)
        N   R(m)
        S   R(m) (not affected if count = 0)
        V   0
```

-continued

| | | |
|---|---|---|
| | O | R(m) != C' (not affected if count = 0) (uses previous C', set by LSCF) |
| | C | R(m+1) (last bit shifted out) (0 if count = 0) |
| | C' | not affected (use LSCF prior to SHLD) |
| | X | R(m+1) (last bit shifted out) (not affected if count = 0) |
| | P | Even parity on R(7-0) (not affected if count = 0) |
| | A | ? (not affected if count = 0) |
| CC = 1110, shift right logical double (SHRD) (see notes) | | |
| | Z | R(m thru 0) = 0 |
| | Z' | R(m thru 0) = 0 (not affected if count = 0) |
| | N | R(m) |
| | S | R(m) (not affected if count = 0) |
| | V | 0 |
| | O | R(m−1) (not affected if count = 0) |
| | C | R(−1) (last bit shifted out) (0 if count = 0) |
| | C' | not affected (use LSCF prior to SHRD) |
| | X | R(−1) (last bit shifted out) (not affected if count = 0) |
| | P | Even parity on R(7-0) (not affected if count = 0) |
| | A | ? (not affected if count = 0) |
| CC = 1111, long shift carry flag (LSCF) (see notes) | | |
| | Z | not affected |
| | Z' | not affected |
| | N | not affected |
| | S | not affected |
| | V | not affected |
| | O | not affected |
| | C | not affected |
| | C' | R(m+1) (left shift) or R(−1) (right shift) (not affected if count = 0) |
| | X | not affected |
| | P | not affected |
| | A | not affected |
| CC = multiply | | |
| | Z | R(m thru 0) = 0 |
| | Z' | not affected |
| | N | R(m) |
| | S | not affected |
| | O | result > 2**(os−1), if unsigned result < −2**(os−1) or > 2**(os−1)−1, if signed |
| | V | results > 2**(os−1), if unsigned result < −2**(os−1) or > 2**(os−1)−1, if signed |
| | C | 0 |
| | C' | O flag |
| | X | not affected |
| | P | not affected |
| | A | not affected |

Notes: The shift CCR operations only make sense if they are attached to a shift LOp.

Translation Lookaside Buffer (TLB)

The TLB is comprised of a 32 entry associative memory, containing the memory logical address (TLBLOG) as the tag and the physical address (TLBPHS) as the returned value, 4 transparent translation address registers (TTRI_n (0,1), TTRD_n (0,1)), and an index (TLBI).

Memory Wrap Around

The memory addresses will be automatically truncated to 20 bits if the machine being emulated is i486 and the MR has the 'P' and 'V' bits on (protected and virtual 8086). They will be truncated to 24 bits if the machine is i486 and the 'Z' bit is on (use zeros for bits 31-24).

Debug Registers

There are four 32-bit debug registers (DR_n (0–3)) containing linear addresses which are monitored by the channel hardware, and a 24-bit register containing a four-bit mask for each DR_n specifying which bytes are to be monitored within the word specified by DR_n, and two bits specifying whether it is an execute, write or read and write breakpoint. When any of the four addresses are referenced by either channel in the specified bytes, with the specified operation type, the 'DR' interrupt is set, and will occur prior to the next emulated instruction. In the case of the instruction stream channel, the interrupt will be before the instruction is emulated; for the I/O channel the instruction referencing the memory will have been emulated. Bits in the MR indicate which DR_n's are active. Bits are set in CSR indicating which DR_n's were matched.

Interrupts and Faults

Interrupts

Interrupts cause a transfer to location 0 in the microcode if there is an interrupt which is not masked (the corresponding bit in the IMR is 1). They happen prior to the beginning of execution of a real machine instruction, i.e., they are triggered by an instruction containing a DD0 ROp without no-interrupt (NI) specified.

| 8 | 7 | 6 | 5 | 4 | 3 | 2 | 1 | 0 |
|---|---|---|---|---|---|---|---|---|
| O | F | X1 | X0 | T | DR | A | TR | DB | where:
- DB = internal debug (always 1, maskable). Used to trigger internal checking, tracing, etc., prior to each emulated instruction.
- TR = trace (always 1, maskable). Used to trigger NuBug type tracing.
- A = alignment trap.
- DR = debug register address match.
- T = timer. Internal count down clock.
- X0 = external interrupt 0 - on board interrupt.
- X1 = external interrupt 1 - support system attention.
- F = fault
- O = MIPS overflow exception Faults Faults are discovered during the execution of the microcode instructions which emulate an instruction. In general, when faults are encountered, bits are posted in the fault register, which identify the types of fault, and the instruction emulation is terminated by flushing the pipeline and transferring control to location 0. The LDSPA contains the address of the instruction being emulated (for this to be true the LDSPA cannot be updated until after phase III of the DD0 instruction).

The fault register has the format:

| 13 | 9 | 8 | 7 | 6 | 5 | 4 | 3 | 2 | 1 | 0 |
|---|---|---|---|---|---|---|---|---|---|---|
| INDX | | W | C | B | D | P | N | E | A | V | where:
- V = 1, invalid (segment)
- A = 1, access (segment)
- E = 1, extent (segment)
- N = 1, invalid address space byte translation (non-page mode)
  - 1, no page (page mode),
- P = 1, protection (page mode)
- D = 1, dirty (page mode)
- B = 1, bound fault (page mode)
- C = 0, channel 0
  - = 1, channel 1
- W = 1, 1st word verified (for page faults)
  - 0, 2nd address verified INDX=the index of the matching entry in the TLB (for re-writing with dirty bit set).

The INDX must always be available, even if no fault occurs, to permit flushing specific entries from TLB.

I/O Faults

I/O operation addresses have various tests performed on them when they are loaded into either channel. In general the tests are performed when the address is loaded. On the instruction stream channel, the tests are also performed when the address is incremented to the next word. There are two classes of tests, those which are controlled by the segment registers (valid segment, access, extent) and those which are performed by the paging hardware if it is active (no page, bound, protection, dirty).

Segment Register Faults

Each segment extent register has a valid (V) bit, an executable (E) bit, an access (A) bit, an expand downward (X) bit and a protection level, to control segment protection checking. There is also a granularity (G) bit which causes the extent value (bits 19-0) to have 12 1 bits appended to it.

The MC will check in both channels for valid segment, out of range addresses, read- or write-protection and privilege level, using the segment registers which are operational for that channel. The checks will be performed on an address when it is loaded into either channel address register (via LDIS, LDF, LDFP or LD). They will also be performed whenever the instruction stream address is incremented.

The valid test causes a valid fault if 'V' bit of the channel extent register is 1.

The write-protect test causes an access fault if the operation is LD and the segment is executable ('E'=1), or write-protected ('E'=0 & 'A'=0).

The read-protect test causes an access fault if the operation is LDF and the segment is executable and read-protected ('E'=1 & 'A'=0). This test is not performed if the reading is for instruction fetch, i.e., LDFIS.

The privilege level test causes an access fault if the current privilege level (CPL bits in the mode register) is>than the segment DPL.

In expand upward segments, the extent check verifies that CAR+Ar−1<=CER. In expand downward segments ('E' bit is reset and the 'X' bit is set), the extent check verifies that CAR>CER. If the default attribute flag ('D') in the active segment is 0 (16 bits), the extent check also verifies that CAR +Ar−1<=x 'FFFF'. If not, an extent fault occurs.

The alignment check is done by the segment logic as well. It does not produce a fault, but sets an interrupt to be honored before the execution of the next instruction. An alignment interrupt occurs if the memory access is four bytes and bits 1-0 of the address are not 0, or the memory access is two byte and bit 0 is not 0.

If the paging hardware is not active, the channel has the responsibility of converting the high-order byte of the channel address to the two bits indicating the address space. If the paging hardware is on, this will be accomplished by the TLB. If the channel cannot accomplish the translation (the address is not in any known address space) the channel will fault with the 'N' bit set.

TLB Faults

The following faults can only occur if the paging hardware is active (the 'PG' bit in MR is 1).

The TLB fault checks are performed every time an address is loaded into a channel's address register, and when channel 0 is incremented to the next word.

If the operation is a write operation and is going to cross a page boundary (i.e., the address loaded is in one page and the address+Ar−1 is in the next page), the 'B' (bound) fault occurs. Bound faults only occur on channel 1.

If the TLB does not contain an entry for the logical address, a no-page fault occurs. Otherwise the TLB entry returned has 'S' (supervisor), 'D' (dirty) and 'W' (write-protected) bits. The TLB will perform the following protection tests on these bits:

If the 'CPL' bits in the mode register=3 (user), the 'S' bit in the entry must be reset (must be a user page), otherwise a protection fault occurs.

If the 'CPL' bits in the mode register=3 (user), or the 'W' bit in the mode register is 1 (perform tests in supervisor mode), and the operation is a write, the 'W' bit in the TLBPHS must be 0, otherwise a protection fault occurs.

If the operation is a write operation and the 'D' bit is 0 (not dirty), a dirty fault occurs to permit the microcode to set the dirty bit in the translation tables.

SUMMARY

The following operations can cause the following faults (the page pointed to by the channel address register is indicated):

| Operation | Segment | TLB |
|---|---|---|
| LDFIS | V,A,E | N,P |
| LDF | V,A,E | N,P |
| LD, LDFP | V,A,E | N,P |

Fault Timing

The following timing considerations apply for any microcoded LD, LDF or LDFP: If paging is on TLB faults (and the corresponding transfer to 0) will occur at the arrow below. (If paging is off, all faults will have occurred one cycle sooner).

In the sequence:

|   | LD := . . . |   | executed |
|---|---|---|---|
|   | . . . |   | executed |
|   | . . . |   | executed |
|   | . . . | DD0 | flushed by fault |
|   | WR_1 := . . . |   | flushed by fault |
| —> |   |   |   |
|   | 0000 |   | . . . | all faults will have occurred in time to abort the DD0 and transfer to location 0 prior to the beginning on the next emulated instruction. Instructions in the pipeline will be flushed as quickly as the fault is noted, prior to going to zero. The first two instructions after the LD, LDF or LDFP will be executed, but subsequent instructions will not.

Address Space

The IMS-3250B recognizes four address spaces: DRAM (00), ROM (01), I/O (10) and Video (11). When the page mode is turned on, the address space is determined by two bits in the TLBPHS register, which are calculated by the microcode, based on the logical address. In the real (non-page) mode, the logical address space is calculated by on chip hardware.

The address ranges in the real mode are allocated as follows:

| Byte addresses | Use | AS |
|---|---|---|
| i486 mode: | | |
| 0 – 0009FFFF | DRAM | 00 |
| 000A0000 – 000BFFFF | VRAM | 11 |
| 000C0000 – 000DFFFF | DRAM | 00 |
| 000E0000 – 000FFF00 | DRAM (VGA bios) | 00 |
| 000FFF00 – 000FFFF0 | DRAM (IMS IO) | 00 |
| 000FFFF0 – 000FFFFF | DRAM | 00 |
| 00100000 – 00FFFFFF | DRAM | 00 |
| 01000000 – 0FFFFFFF | Future DRAM | 00 |
| 10000000 – 4FFFFFFF | unassigned | ?? |
| 50000000 – 5FFFFFFF | I/O | 10 |
| 60000000 – FFFFFFFF | unassigned | ?? |

In the page mode, logical addresses 01000000-FFFFFFFF will be available as DRAM addresses.

| Byte addresses | Use | AS |
|---|---|---|
| m40 mode: | | |
| 0 – 00FFFFFF | DRAM | 00 |
| 01000000 – 0FFFFFFF | future DRAM | 00 |
| 10000000 – 3FFFFFFF | unassigned | ?? |
| 40000000 – 4FFFFFFF | ROM | 01 |
| 50000000 – 5FFFFFFF | I/O | 10 |
| 60000000 – F8FFFFFF | unassigned | ?? |
| F9000000 – F9FFFFFF | Video | 11 |
| F9000000 – F97FFFFF | VRAM | 11 |
| F9800000 – F9FFFFFF | Clut | 11 |
| FA000000 – FFFFFFFF | unassigned | ?? |

Shadowing

In the i486 mode the physical address space range immediately above the top of physical memory, (00100000–0013FFFF, 00800000–0083FFFF, 00400000–0043FFFF or 00200000–0023FFFF) will mapped (shadowed) into the physical address range 000A0000–000DFFFF. Also the range FFFFFFF0–FFFFFFFF will be mapped into the range 000FFFF0–000FFFFF. The physical addresses between FFF00 and FFFF0 will be reserved for I/O device register emulation. The address range E0000-FFFFF is write-protectable thru the W bit in the EMR.

Reset

At the beginning of the emulation of each emulated machine instruction a "reset" occurs. This resets the B bit in the mode register (MR) to permit bound faults.

Test Pins

One test pin is provided to enhance silicon testability.

| Pin Name | Function |
|---|---|
| TST | places XR(31-0) on MCD(31-0) |

| Mnemonic | # | bits | name |
|---|---|---|---|
| Registers | | | |
| A32 | 1 | 1 | address size |
| C0DATA | 1 | 128 | channel 0 data register |
| C1DATA | 1 | 56 | channel 1 data register |
| CAR_(1-2) | 2 | 32 | channel address registers |
| CBR_(0-5) | 6 | 32 | channel segment base registers |
| CCR | 1 | 16 | condition code register |
| CER_(0-5) | 6 | 28 | channel segment extent registers |
| CPR_(1-2) | 2 | 11 | channel parameter registers |
| CSR | 1 | 8 | channel status register |
| DBR | 1 | 6 | dispatch base registers |
| DCR | 1 | 24 | debug control register |
| DR_(0-3) | 4 | 32 | debug registers |
| EMR | 1 | 13 | emulation mode register |
| ER(0-31) | 32 | 32 | emulation registers |
| FEXP(0-7) | 8 | 16 | floating point exponents |
| FLSW(0-7) | | | alias for ER(24-31) |
| FMSW(0-7) | | | alias for ER(16-23) |
| FR | 1 | 8 | fault register |
| FSTK | 1 | 3 | floating point stack pointer |
| IMR | 1 | 9 | interrupt mask register |
| IR | 1 | 9 | interrupt register |
| LSR | 8 | 32 | link stack |
| MMSW | 1 | 32 | multiplication most significant word |
| MR | 1 | 14 | mode register |
| MR(0-15) | 16 | 32 | memory registers |
| MRH(0-15) | 16 | 16 | memory registers |
| O32 | 1 | 1 | operand size |
| R(0-7) | 8 | 32 | general registers |
| RI(0-2) | 3 | 5 | register indirect registers |
| RI2S | 1 | 3 | RI2 scale and sign extension |
| S32 | 1 | 1 | stack size |
| TLBI | 1 | 5 | TLB index |
| TLBLOG | 32 | 22 | TLB logical addresses |
| TLBPHS | 32 | 17 | TLB physical addresses |
| TTRI/D(0-1) | 4 | 20 | Transparent translation registers |

| Name | Bits | Description |
|---|---|---|
| New Registers | | |
| DADR(2-0): | 16 | Dispatch address |
| DCAR: | 32 | The address to be inserted into CAR_0 or CAR_1. |
| DCDR(2-0): | 24 | prefixes, CPR data, flags (remove bits from CPR, remove prefix register) |
| DFR: | 16 | A copy of the fault register. |
| DSPR: | 32 | displacement. 1 of three fields for effective address (ea) calculation. |
| DSEG: | 6 | segment register # for EA calculation |
| IMMR(2-0): | 32 | immediate field register |
| IP(2-0): | 32 | instruction address displacement |
| RIB: | 5 | pointer to base register |
| RII: | 5 | pointer to index register |
| SELR: | 16 | holds segment selector field on far jumps. |

General Registers (R0-R? ).

The processor contains eight general purpose 32-bit registers.

```
31                              0
|                               |
```

Link Stack (LSR).

The processor contains eight 32-bit registers which comprise a last-in first-out register stack.

```
31                              0
|                               |
```

Emulation Registers (ER0–ER31).

32 registers are used to emulate the registers of the machine being emulated (ER0–ER31). These registers are addressable thru the emulation indirect registers RI0, RI1 and RI2 which can contain the values 0–15. The are also directly addressable thru the AR or DD ROps.

```
31         16 15     8 7        0
|           |         |         |
```

ER(0–3) are addressable as 32-bit registers, 16-bit registers (15-0), or byte registers (15-8) or (7-0).

ER(4–7) are addressable as 32 bit registers, 16-bit registers (15-0), or byte registers (7-0).

ER(8–15) are addressable as 32-bit registers or 16-bit registers (15-0).

ER(16–31) are addressable as 32 bit registers.

Special Registers

A 32 Register (1-bit)

This "register" is the 'D' bit in CER_1 XOR the 'A' bit in the prefix register (PR).

External Input Register (EIR)

The external bus (3250P only) terminates in a 32-bit register.

```
31                                    0
|                                     |
```

Emulation Mode Register (EMR)

```
12  11    10  8   6     5    4  3 2 1   0
| rtc | lcyc | dch | ich | lcmp | a20m | a20g |w| s | mach |
``` where:
- rtc = 0, normal
  - 1, nibble mode for testing
- lcyc = 0, 1 cycle dispatches enabled
  - 1, 1 cycle dispatches disabled
- dch = data cache
- ich = instruction cache
  - 0, normal cache
  - 1, cache only
  - 2, no cache mode
  - 3, locked cache
- lcmp = 0, 2's complement arithmetic
  - 1, 1's complement arithmetic (C1)
- a20m = 0, use address bit 20
  - 1, use a20g (A20M)
- a20g = 0, use address bit 20
  - 1, set address bit 20 to 0 (A20G)
- w = 0, no write protect on system ROM
  - 1, write protect system ROM (W)
- s = 0, shadow mode off
  - 1, shadow mode on (S)
- mach = 0, i486
  - 1, m40
  - 2, mips
  - 3, cfm

Fault Register (FR).

The fault register is a 14-bit register containing bits corresponding to internal faults and various other information required for fault processing (see *Interrupts and Faults* for description).

```
13  9 8 7 6 5 4 3 2 1 0
|INDX|W|C|B|D|P|N|E|A|V|
```

Interrupt Mask Register (IMR)

The interrupt mask register is a 9-bit registers which controls which pending interrupts will be acknowledged by the DD0 instruction (see *Interrupts and Faults* for description).

```
8 7 6 5 4 3 2 1 0
| O|F|X1|X0| T|DR| A|TR|DB|
```

Interrupt Register (IR)

The interrupt register is a 9-bit register containing bits corresponding to external interrupts which are pending.

```
8 7 6 54 3 2 1 0
|O|F|X1|X0|T|DR|A|TR|DB|
```

Mode Register (MR)

```
13   12    11    10   9 8  7  6  5 4 3 2 1 0
| DR3 | DR2 | DR1 | DR0 |B| PG |Z| W | F| E|CPL|V| P|
``` where:
- Drn = 0, debug registers n is not active
  - = 1, Drn is active
- B = 0, permit bound faults
  - = 1, suppress bound faults
- PG = 0, no paging
  - = 1, paging
- Z = 0, use 0's for bits 31-24 of logical address
  - = 1, use bits 31-24 of logical address
- W = 0, do not perform page access test in supervisor mode
  - = 1, do perform page access test in supervisor mode
- F = FC2 (m40 function code bit)
- E = 0, little endian channel byte order (i486)
  - = 1, big endian channel byte order (m40)
- CPL = privilege level (0, 1, 2 = supervisor, 3 = user)
- V = 0, not virtual 8086 mode
  - = 1, virtual 8086 mode
- P = 0, real mode
  - = 1, protected mode O32 Register (1 bit)

This "register" is the 'D' bit in CER_1 XOR the 'O' bit in the prefix register (PR).

S32 Register (1 bit)

This "register" is the 'D' bit in CER 2.

I/O Channel Registers

There is one channel Parameter Register (CPR), and one status register (CSR), containing parameters and status associated with the I/O channel. In addition the I/O channel has an address register.

Channel Parameter Registers (CPR_n (1-2))

```
10  9 7   6   5 0
| notlb | wd | iso | seg |
``` where:
- notlb = 0, normal TLB operation
  - = 1, ignore TLB
- Wd = the arithmetic width:
  - = 00, 8 bits
  - = 01, 16 bits
  - = 10, 32 bits
  - = 11, unassigned
  - = 100, operand size
    - (O32 = 0 -> 16; 1 -> 32)
  - = 101, address size
    - (A32 = 0 -> 16; 1 -> 32)
  - = 110, stack size
    - (S32 = 0 -> 16; 1 -> 32)
  - = 111, unassigned
- iso = 1, ignore segment over-ride for specified channel Seg is a six bit field for the specified channel:

| | |
|---|---|
| 000001 | segment 0 |
| 000010 | segment 1 |
| 000100 | segment 2 |
| 001000 | segment 3 |
| 010000 | segment 4 |
| 100000 | segment 5 |
| 000000 | no segment (segment 6) |

Channel Status Register (CSR)

The channel status register can be examined by the microcode to determine details of the last LD(F(P))_n or EA operation:

```
10 9 8 7 5 4   3   2   1   0
| n| F| P| seg |w| D3 | D2 | D1 | D0 |
``` where:
- n = 0, channel 1
  - 1, channel 2

43
-continued

```
F = LDF or LDFP
P = LD or LDFP
seg is the segment associated with channel
w = 1, write operation, 0, read operation
D3 is set if debug register 3 matched the address of the
  last word referenced thru this channel.
D2 is set if debug register 2 matched the address of the
  last word referenced thru this channel.
D1 is set if debug register 1 matched the address of the
  last word referenced thru this channel.
D0 is set if debug register 0 matched the address of the
  last word referenced thru this channel.
```

Channel Address Registers (CAR_n (1-2))

```
 31                                          0
|                                             |
|                   Address                   |
``` where:

Address is the byte address of the current (next to be read or written) data.

There are also six sets of two segment registers:

Channel Base Register (CBR_n (0–5))

```
 31                                          0
|                                             |
|                 Base Address                |
``` where:

Base Address is added to the contents of the Address Register to give the effective address.

Channel Extent Register (CER_n (0–5 ))

```
 27   8 7   6 5   4   3   2   1   0
|Extent|DPL| G | D | E | X | A | V |
``` where:
- Extent — the value of the address register is not allowed to exceed Extent.
- DPL = descriptor privilege level
- G = granularity
  - = 0, extent is bits 19–0
  - = 1, extent is bits 19–0 followed by 12 1 bits.
- D = default attributes.
  - = 0, 16 bit segment
  - = 1, 32 bit segment.
    Note: If the 'D' bit is reset, the limit test on expand downward segments is 16 bits wide.
- E = executable.
  - = 0, data segment
  - = 1, executable segment
- X = expand downward.
  - = 0, no expand downward
  - = 1, expand downward
- A = access.
  - = 0, not writable if data, not readable if executable
  - = 1, writable if data, readable if executable
- V = valid.
  - = 0, valid segment
  - = 1. invalid segment The I/O channel has data registers which contain the up to 7 bytes of data from/for channel 1 (the second word is used if the channel is in a 16 or 32 bit mode and the data is not entirely contained in the first register).

```
 31                                          0
|                                             |

23                            0
            |                               |
```

44
Instruction Stream Channel Registers

Dispatch address register (DADR)

This register holds the address to which the DD0 will transfer. There is no third copy of this register. It becomes the instruction address when added to the dispatch base register at DD0 time, through P2_DISP.

Channel Address Register (DCAR)

This register holds the LA without the segment base address to be inserted into the appropriate CAR_n.

Decode Register (DCDR)

This register holds various fields relating to the instruction parsing.

```
 23 22  21  20  19  18  17  16–15 14–12 11–9  8  7–5 4 3 2 1 0
| J  Ch  F  Ao  Ld  Ea  Se    Sc    Wd  Seg  0F Sego L N R A O|
``` where:
- O    = Operand size override
- A    = address size override
- R    = REP or REPE
- N    = REPNE
- L    = lock
- Sego = segment override
- 0F   = 0F opcode encountered
- Seg  = segment used for argument address
- Wd   = width for I/O operation
- Sc   = scale
  - 0 = * 1
  - 1 = * 2
  - 2 = * 4
  - 3 = * 8
- Se   = sign extend
- Ea   = effective address calculation necessary
- Ld   = write only argument
- Ao   = address only (put ea into DSP)
- F    = Fault encountered
- Ch   = channel # for CAR
- J    = Jump instruction This register begins reset for each instruction (with sego reset to 7, all other bits reset to 0). After a DD0, Sego moves to the Sego register, the N, R, A and 0 to the prefix register, and Wd, Se, Sc and Seg to the CPR. L is currently ignored. AA flags that an argument address calculation is required for restarting this instruction. LD indicates that the argument does not need to be fetched (the operation is LD_1, not LDF_1). AO prevents the argument address from going anywhere beyond CAR_1.

Decode Fault Register (DFR)

This registers will record any faults which may have occurred during channel address calculations. Faults will be processed at DD0 time.

Displacement Register (DSPR)

The displacement register holds 1 or 2 bytes, sign extended, or 4 bytes for use in argument address calculations. On relative jumps it holds the relative displacement (2's complement) sign extended.

Decode Seqment Register (DSEG)

The decode segment register is a 6-bit register with one 1 bit selecting the correct base register.

Immediate Register (IMMR)

This register holds 1, 2, or 4 bytes of immediate data from the instruction. The data is sign extended and/or zero filled to always make 32 bits.

Instruction pointer(2-0) (IP)

Instruction logical address (including segment base).

Indirect Registers (RI0, RI1 & RI2)

These registers hold pointers to various emulation registers (ER0–ER15).

Base Indirect Register (RIB)

This register holds the register number of the argument address calculation base register.

Index Indirect Register (RII)

This register holds the register number of the argument address calculation index register.

Selector Register (SELR)

This register holds the segment for far calls and jumps. It also holds the outer displacement for m40 address calculations.

Data Registers

The instruction channel also has data registers which contain the next 16 bytes:

```
31                                   0
|                                    |
|                                    |
|                                    |
|                                    |
```

TLB Registers

TLB Loqical Address Registers (TLBLOG)

There are 32 logical address registers containing the tags for the TLB associative memory.

```
                  21        2  1  0
                 |Logical Address|V|F|
(stored from: XR | 20          1| 0|  F bit in MR)
``` where:
V = 1, invalid entry
  = 0, valid entry
F = F bit in mode register
Logical Address is the virtual address TLB Physical Address Registers (TLBPHS)

There are 32 physical address registers containing the physical page address returned by the TLB associative memory.

```
      16              5 4 3 2 1 0
     | Physical Address |AS| D | W | S |
``` where:
Physical Address is the DRAM page address.
AS  = Address Space
    = 00, DRAM
    = 01, ROM
    = 10, I/O
    = 11, Video
S   = 0, user page
    = 1, supervisor page
D   = 0, not dirty
    = 1, dirty
W   = 0, read/write
    = 1, read only TLB Index Register (TLBI)

The TLBI register is a 5-bit register which contains the index of the last entry added to the TLB associative cache. It is maintained entirely by the microcode.

```
    4    0
  | index |
```

Transparent Translation Registers (TTRI_n(0–1), TTRD_nC0-1))

The transparent registers have the format:

```
19  12 11  4  3  2  1  0
|BASE|MASK| E |FM|FD| W |
``` where:
base is the base address of the address range which is transparent to page translation.
mask selects which bits of the base are to be compared to bits 32–24 of the logical address.
E   = 0, this register is not enabled
    = 1, enabled
FM  = 0, compare FD
      1, ignore FD comparison
FD  = one bit to compare with FC2
W   = 0, read and write permitted
    = 1, write not permitted Debug Registers There are 4 debug address registers (DR0-3) and a debug control register (DCR) used by the 3250B processor.

DR_n (0-3)

These four registers contain four linear addresses which are used for address comparison in the two channels.

```
    31                           0
  |         linear address        |
```

Debug Control Register (DCR)

```
23   21   19   17   15   11   7   3   0
|RW3|RW2|RW1|RW0|Mask3|Mask2|Mask1|Mask0|
``` where:
RWn   = 00, execute breakpoint
      = 01, write breakpoint
      = 10, undefined (implemented as read breakpoint)
      = 11, read/write breakpoint.
Maskn = nnnn (3,2,1,0)
        n = 0 if byte is not included in breakpoint
        =1 if byte is included in breakpoint.

Condition Code Registers

The condition code register is a 22-bit register containing the flag register of the machine begin emulated.

```
    21                           0
  |          flag bits            |
```

Memory Registers

Memory registers are different from special registers in that they are implemented as memory and are not used by the microprocessor. They are intended as storage for internal state registers on the various emulated machines.

Memory Data Registers

MRH_n (0-15)

```
    15                           0
  |            data               |
```

MR_n (0-15)

```
    31                           0
  |            data               |
```

Floatinq Point Registers

FSTK

47

This 3-bit register is the pointer to the current top of the floating point stack.

FEXP (0-7)

The 16-bit exponents of the floating point registers.

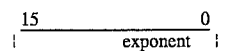

FMSW (0-7)

The 32-bit most significant words of the floating point registers. These registers are the same as ER(16–23).

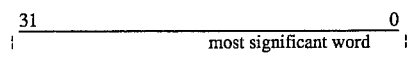

FLSW (0-7)

The 32-bit least significant words of the floating point registers. These registers are the same as ER(23–31).

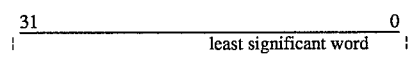

Product Packaging

The IMS-3250P is fabricated on a single sub-micron die with 175 signal I/O pads (development system) or 81 signal I/O pads (production system). Operating power supply requirements are estimated at 1–2 watts (less than 1 ampere at 5.0 volts).

| Signal Name | Type | Function | Pin Count |
|---|---|---|---|
| Package Pin Functions: | | | |
| MD(31-0) | I/O | Memory Data | 32 |
| CA(31-2) | O | Cache Memory Address | 30 |
| MA(9-0) | O | multiplexed DRAM address | 10 |
| RAS0' | O | Row Address Strobe (bank 0 - low addresses) | 1 |
| RAS1' | O | Row Address Strobe (bank 1 - high addresses) | 1 |
| CASA(3-0)' | O | Column Address Strobe (bank A - even addresses) | 4 |
| CASB(3—0)' | O | Column Address Strobe (bank B - odd addresses) | 4 |
| BE(3-0)' | O | Byte enables | 4 |
| WE' | O | Data Memory Write Strobe | 1 |
| IO_64 | O | 64 bit data transfer | 1 |
| IO_STRT' | O | begin I/O memory cycle | 1 |
| IO_DATA' | I | data ready | 1 |
| CH1OE' | O | ch 1 cache output enable | 1 |
| CH1WE0' | O | ch 1 cache write enable byte 0 | 1 |
| CH1WE1' | O | ch 1 cache write enable byte 1 | 1 |
| CH1WE2' | O | ch 1 cache write enable byte 2 | 1 |
| CH1WE3' | O | ch 1 cache write enable byte 3 | 1 |
| CH0OE' | O | Ch 0 Cache output enable | 1 |
| CH0WE' | O | Ch 0 Cache write enable | 1 |
| VRAMS' | O | Video ram select | |
| IOS' | O | I/O Chip Select | |
| ROMS' | O | ROM Memory Selecty | 1 |
| MB_SIZE | I | 0 = 1M, 1 = 2M SIMMs | 1 |
| BANKS | I | 0 = 1, 1 = 2 Banks memory | 1 |
| CACHE | I | Cache enable | 1 |
| SYNC | I | Synchronous memory enable | 1 |
| R_MEM' | O | Remote DRAM select | 1 |
| REF_REQ | I | Refresh DRAM | 1 |
| EI0 | I | External Interrupt | 1 |
| EXCLR' | I | System Clear | 1 |
| EXFRCLK | I | System Clock | 1 |
| FORCE' | I | (development use only) | 1 |

48

-continued

| | | | | |
|---|---|---|---|---|
| PO | O | (parametric tree test pin) | 1 | |
| TST | I | Test | 1 | |
| 3250B Total: | | | 112 | 112 |
| 3250P additional pins | | | | |
| EI1 | I | External Interrupt | 1 | |
| EB(31-0)' | I/O | External Bus Data | 32 | |
| YSEL(1-0)' | O | Y select | 2 | |
| XSEL(1-0) | O | X select | 2 | |
| YSSTRB' | O | Y Strobe | 1 | |
| XSTRB' | O | X Strobe | 1 | |
| DAVL' | I/O | Data Available | 1 | |
| ACK' | I/O | Acknowledge | 1 | |
| SCANLD | I | Scan Load | 1 | |
| SCCLK | I | Scan Clock | 1 | |
| SCDATA | O | Scan Data | 1 | |
| IA(15-0) | I/O | Instruction Address | 16 | |
| IB(31-0) | I | Instruction Data | 32 | |
| IAENB | I | Instruction Address Enable | 1 | |
| RUN | I | Run | 1 | |
| Total: | | | 94 | 94 |
| 3250P Total: | | | | 206 |

Interfaces

Memory Interface
Possible Configurations

| | | | |
|---|---|---|---|
| 1. | 256K * 8 DRAM SIMMs | 8 SIMMs | 2 mbytes |
| 2. | 256K * 8 DRAM SIMMs | 16 SIMMs | 4 mbytes |
| 3. | 1M * 8 DRAM SIMMs | 8 SIMMs | 8 mybtes |
| 4. | 1M * 8 DRAM SIMMs | 16 SIMMs | 16 mybtes |

Signals

| | | |
|---|---|---|
| D(31-0) | O | data lines |
| MA(9-0) | O | 256K * 8   RAS (address bits 18-10) CAS (address bits 9-1) |
| | O | 1M * 8   RAS (address bits 10-11) CAS (address bits 10-1) |
| RAS0' | O | Selects Bank 0 (address bit 21 or 19) = 0 |
| RAS1' | O | Selects Bank 1 (address bit 21 or 19) = 1 |
| CAS_A(3-0)' | O | CAS for Bank A (address bit 0 = 0) |
| CAS_B(3-0)' | O | CAS for Bank B (address bit 0 = 1) |
| WE' | O | Write enable |
| IO_64 | O | 64 bit I/O |
| MB_SIZE | I | 256K * 8 DRAM SIMMs |
| BANKS | I | 2 Banks present |

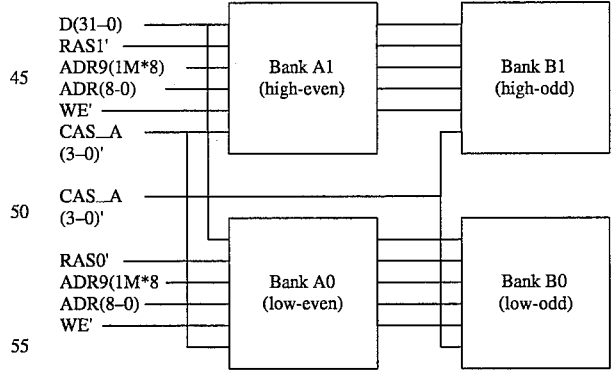

VGA Interface

The VGA system interface is an extension of the memory interface. The signal VRAS is activated if the memory address is in the video ram address space (x'A0000'-x'BFFFF' for the i486). The video subsystem will have to provide the IO_CLK(1-4) and IO_END signals to complete the cycle. It is assumed that the video subsystem will buffer all the signals it uses, to present a single common interface to the 3250.

The VGA bios will be loaded into the DRAM in the E0000–FFF00 address space.

Additional signals

| | | |
|---|---|---|
| VRAMS | O | Video Ram Select |
| BE(3-0) | O | Byte enables |

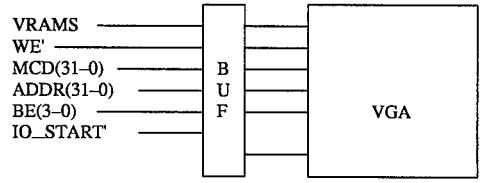

Instruction Formats

The instruction set of the IMS-3250B is presented below in a binary bit pattern format. Both a mnemonic and binary value are included for operator (LOp or ROp) fields. Where appropriate, individual bits of a field are described by the following legend:

| Legend | |
|---|---|
| a = | A field bits or address field |
| b = | B field bits |
| l = | Literal data |
| m = | mask data |
| n = | multiplier value |
| r = | RHS operation code |
| s = | shift or skip value |
| t = | T field bits |
| w = | width specification |
| x = | unspecified (0 or 1) |

| LOp | T 31-28 | A 27-24 | LOp 23-20 | B 19-16 | Literal (16) 15--------------0 |
|---|---|---|---|---|---|
| SRA | tttt | aaaa | 0001 | 0000 | xxxxxxxx xxxsssss |
| SLLD | tttt | aaaa | 0010 | 0bbb | xxxxxxxx xxxsssss |
| SRLD | tttt | aaaa | 0010 | 1bbb | xxxxxxxx xxxsssss |
| SLL | tttt | aaaa | 0100 | 0000 | xxxxxxxx xxxsssss |
| SRL | tttt | aaaa | 0101 | 0000 | xxxxxxxx xxxsssss |
| SLR | tttt | aaaa | 0110 | 0000 | xxxxxxxx xxxsssss |
| SRR | tttt | aaaa | 0111 | 0000 | xxxxxxxx xxxsssss |
| + | tttt | aaaa | 1000 | 0010 | 11111111 11111111 |
| +C | tttt | aaaa | 1000 | bbbb | 00000001 xxxxxx00 |
| +O | tttt | aaaa | 1000 | bbbb | 00000001 xxxxxx01 |
| +EC | tttt | aaaa | 1000 | bbbb | 00000001 xxxxxx10 |
| +EX | tttt | aaaa | 1000 | bbbb | 00000001 xxxxxx11 |
| XOR | tttt | aaaa | 1001 | 0010 | 11111111 11111111 |
| OR | tttt | aaaa | 1010 | 0010 | 11111111 11111111 |
| AND | tttt | aaaa | 1011 | 0010 | 11111111 11111111 |
| - | tttt | aaaa | 1100 | 0010 | 11111111 11111111 |
| -C | tttt | aaaa | 1100 | bbbb | 00000001 xxxxxx00 |
| -O | tttt | aaaa | 1100 | bbbb | 00000001 xxxxxx01 |
| -EC | tttt | aaaa | 1100 | bbbb | 00000001 xxxxxx10 |
| -EX | tttt | aaaa | 1100 | bbbb | 00000001 xxxxxx11 |
| DISP | tttt | axnn | 1110 | xwww | aaaaaaaa aaaaaaaa |

| LOp | T 31-28 | A 27-24 | LOp 23-20 | B 19-16 | ROp 15-12 | Address (12) 11---------0 |
|---|---|---|---|---|---|---|
| * | tttt | aaaa | 0000 | bbbb | rrrr | aaaaaaaaaaaa |
| SRA | tttt | aaaa | 0001 | 1bbb | rrrr | aaaaaaaaaaaa |
| SRA | tttt | aaaa | 0001 | 0111 | rrrr | aaaaaaaaaaaa |
| SLLDX | tttt | aaaa | 0011 | 0bbb | rrrr | aaaaaaaaaaaa |
| SRLDX | tttt | aaaa | 0011 | 1bbb | rrrr | aaaaaaaaaaaa |
| SLL | tttt | aaaa | 0100 | 1bbb | rrrr | aaaaaaaaaaaa |
| SLL | tttt | aaaa | 0100 | 0111 | rrrr | aaaaaaaaaaaa |
| SRL | tttt | aaaa | 0101 | 1bbb | rrrr | aaaaaaaaaaaa |
| SRL | tttt | aaaa | 0101 | 0111 | rrrr | aaaaaaaaaaaa |
| SLR | tttt | aaaa | 0110 | 1bbb | rrrr | aaaaaaaaaaaa |
| SLR | tttt | aaaa | 0110 | 0111 | rrrr | aaaaaaaaaaaa |
| SRR | tttt | aaaa | 0111 | 1bbb | rrrr | aaaaaaaaaaaa |
| SRR | tttt | aaaa | 0111 | 0111 | rrrr | aaaaaaaaaaaa |
| + | tttt | aaaa | 1000 | bbbb | rrrr | aaaaaaaaaaaa |
| XOR | tttt | aaaa | 1001 | bbbb | rrrr | aaaaaaaaaaaa |
| OR | tttt | aaaa | 1010 | bbbb | rrrr | aaaaaaaaaaaa |
| AND | tttt | aaaa | 1011 | bbbb | rrrr | aaaaaaaaaaaa |
| - | tttt | aaaa | 1100 | bbbb | rrrr | aaaaaaaaaaaa |
| BS | tttt | aaaa | 1101 | 0000 | rrrr | aaaaaaaaaaaa |
| SEB | tttt | aaaa | 1101 | 0001 | rrrr | aaaaaaaaaaaa |
| SEH | tttt | aaaa | 1101 | 0010 | rrrr | aaaaaaaaaaaa |
| SEOS | tttt | aaaa | 1101 | 0011 | rrrr | aaaaaaaaaaaa |
| ZFB | tttt | aaaa | 1101 | 0101 | rrrr | aaaaaaaaaaaa |
| ZFH | tttt | aaaa | 1101 | 0110 | rrrr | aaaaaaaaaaaa |
| SEAS | tttt | aaaa | 1101 | 0111 | rrrr | aaaaaaaaaaaa |
| OFB | tttt | aaaa | 1101 | 1001 | rrrr | aaaaaaaaaaaa |
| OFH | tttt | aaaa | 1101 | 1010 | rrrr | aaaaaaaaaaaa |
| SESC | tttt | aaaa | 1101 | 1011 | rrrr | aaaaaaaaaaaa |
| CHGS | tttt | aaaa | 1101 | 1100 | rrrr | aaaaaaaaaaaa |
| CLRS | tttt | aaaa | 1101 | 1101 | rrrr | aaaaaaaaaaaa |
| SETS | tttt | aaaa | 1101 | 1110 | rrrr | aaaaaaaaaaaa |
| CLB | tttt | aaaa | 1101 | 1111 | rrrr | aaaaaaaaaaaa |
| BF | tttt | aaaa | 1111 | bbbb | rrrr | aaaaaaaaaaaa |

| LOp | T 31-28 | A 27-24 | LOp 23-20 | B 19-16 | ROp 15-12 | Operand 11---------0 |
|---|---|---|---|---|---|---|
| BF,INC4 | tttt | aaaa | 1111 | 0000 | rrrr | aaaaaaaaaaaa |
| BF,DEC4 | tttt | aaaa | 1111 | 0001 | rrrr | aaaaaaaaaaaa |
| BF,INC | tttt | aaaa | 1111 | 0010 | rrrr | aaaaaaaaaaaa |
| BF,DEC | tttt | aaaa | 1111 | 0011 | rrrr | aaaaaaaaaaaa |
| BF,INC2 | tttt | aaaa | 1111 | 0100 | rrrr | aaaaaaaaaaaa |
| BF,DEC2 | tttt | aaaa | 1111 | 0101 | rrrr | aaaaaaaaaaaa |
| BF,INC3 | tttt | aaaa | 1111 | 0110 | rrrr | aaaaaaaaaaaa |
| BF,DEC3 | tttt | aaaa | 1111 | 0111 | rrrr | aaaaaaaaaaaa |
| BF,n.u. | tttt | aaaa | 1111 | 1000 | rrrr | aaaaaaaaaaaa |
| BF,FILLOS | tttt | aaaa | 1111 | 1001 | rrrr | aaaaaaaaaaaa |
| BF,FILLB | tttt | aaaa | 1111 | 1010 | rrrr | aaaaaaaaaaaa |
| BF,FILLH | tttt | aaaa | 1111 | 1011 | rrrr | aaaaaaaaaaaa |
| BF,LUN1 | tttt | aaaa | 1111 | 1100 | rrrr | aaaaaaaaaaaa |
| BF,FLOAT | tttt | aaaa | 1111 | 1101 | xxxx | xxxxxbbbrrrr |
| BF,LINKL | tttt | aaaa | 1111 | 1110 | aaaa | aaaaaaaaaaaa |
| BF,TRAL | tttt | aaaa | 1111 | 1111 | aaaa | aaaaaaaaaaaa |

| ROp | T 31-28 | A 27-24 | LOp 23-20 | B 19-16 | ROp 15-12 | Operand 11---------0 |
|---|---|---|---|---|---|---|
| SUBOP | tttt | aaaa | xxxx | bbbb | 0000 | rrrraaaaaaaa |
| DD | tttt | aaaa | xxxx | bbbb | 0001 | aaaaaaaaaaaa |
| AR | tttt | aaaa | xxxx | bbbb | 0010 | aaaaaaaaaaaa |
| AR | tttt | aaaa | xxxx | bbbb | 0011 | aaaaaaaaaaaa |
| SKIP | tttt | aaaa | xxxx | bbbb | 0100 | rrssmmmmmmmm |
| SCH | tttt | aaaa | xxxx | bbbb | 0101 | aaaaaaaaaaaa |
| LINK | tttt | aaaa | xxxx | bbbb | 0110 | aaaaaaaaaaaa |
| TRA | tttt | aaaa | xxxx | bbbb | 0111 | aaaaaaaaaaaa |
| TRA on NOV | tttt | aaaa | xxxx | bbbb | 1000 | aaaaaaaaaaaa |
| TRA on OV | tttt | aaaa | xxxx | bbbb | 1001 | aaaaaaaaaaaa |
| TRA on NLB | tttt | aaaa | xxxx | bbbb | 1010 | aaaaaaaaaaaa |
| TRA on LB | tttt | aaaa | xxxx | bbbb | 1011 | aaaaaaaaaaaa |
| TRA on Z | tttt | aaaa | xxxx | bbbb | 1100 | aaaaaaaaaaaa |
| TRA on NZ | tttt | aaaa | xxxx | bbbb | 1101 | aaaaaaaaaaaa |
| TRA on NHB | tttt | aaaa | xxxx | bbbb | 1110 | aaaaaaaaaaaa |
| TRA on HB | tttt | aaaa | xxxx | bbbb | 1111 | aaaaaaaaaaaa |

| ROp | T 31-28 | A 27-24 | LOp 23-20 | B 19-16 | ROp 15-12 | ROpE 11-8 | Operand 7------0 |
|---|---|---|---|---|---|---|---|
| ROp0,NOP | tttt | aaaa | xxxx | bbbb | 0000 | 0000 | xxxxxxxx |
| ROp0,BUS | tttt | aaaa | xxxx | bbbb | 0000 | 0001 | aaaaaaaa |
| ROp0, JUMPEA | tttt | aaaa | xxxx | bbbb | 0000 | 0010 | xxxxxxxx |
| ROp0, TRINT | tttt | aaaa | xxxx | bbbb | 0000 | 0011 | aaaaaaaa |
| ROp0,SPR | tttt | aaaa | xxxx | bbbb | 0000 | 0100 | xxxaaaaa |
| ROp0,RTN | tttt | aaaa | xxxx | bbbb | 0000 | 0101 | aaaaaaaa |
| ROp0,SCF | tttt | aaaa | xxxx | bbbb | 0000 | 0110 | aaaaaaaa |
| ROp0,RCF | tttt | aaaa | xxxx | bbbb | 0000 | 0111 | xxxxxxxx |
| ROp0,REEA | tttt | aaaa | xxxx | bbbb | 0000 | 1000 | aaaaaaaa |
| ROp0,n.u. | tttt | aaaa | xxxx | bbbb | 0000 | 1001 | aaaaaaaa |
| ROp0,n.u. | tttt | aaaa | xxxx | bbbb | 0000 | 1010 | aaaaaaaa |
| ROp0,n.u. | tttt | aaaa | xxxx | bbbb | 0000 | 1011 | aaaaaaaa |
| ROp0,n.u. | tttt | aaaa | xxxx | bbbb | 0000 | 1100 | aaaaaaaa |
| ROp0,n.u. | tttt | aaaa | xxxx | bbbb | 0000 | 1101 | aaaaaaaa |

51
-continued

```
ROp0,n.u.    tttt   aaaa   xxxx   bbbb   0000   1110   aaaaaaaa
ROp0,n.u.    tttt   aaaa   xxxx   bbbb   0000   1111   aaaaaaaa
```

Decodes i486 decode
Dispatch Address, Indirect registers
The i486 decode logic calculates the dispatch address as follows:

dispatch address for non group instructions:

```
15-13  12  11  10   9   8           1  0
| DBR | F  F'|  0 | R | dopcode   |  0 |
``` dispatch address for group instructions:

```
15     13 12  11  9   8   5   4   3    1  0
| DBR |  1 |  000 | grp#| R | reg |   0 |
``` where:
DBR    = 3 bit dispatch base register
F      = 1 if it is a 2 byte (0f) opcode
F'     = not F
R      = 1 if register to register operation
dopcode = dispatch opcode:
          for 1 byte opcodes dopcode = opcode,
          for 2 byte opcodes dopcode =
          opcode    dopcode 0–f       0–f
          10–1f     0f
          20–2f     10–1f
          30–7f     0f
          80–cf     20–6f
          a0–ff     0f
grp#   =
          opcode    grp#

80        0
          81        1
          83        2
          C0        3
          C1        4
          D0        5
          D1        6
          D2        7
          D3        8
          F6        9
          F7        10
          FE        11
          FF        12
          0F00      13
          0F01      14
          0FBA      15
reg =mdregr/m byte bits [5:3]
For all dispatches:
RI0 =0 reg
RI1 = r/m
RI2 = opcode[2:0]
m40
DD0

For the m40 emulation DD0 (and DD0NR) is a special dispatch which does not use the dispatch parameter registers. The dispatch is as follows:

```
15--12  11---9  8----6  5----3  2----0
|opcode | reg1 | mod1  | mod2  | reg2 |
```

RI0 = reg1
RI1 = reg 2
RI2 = reg1
ADSP =
LIT = bits (7–0)

If the opcode is not 6, 7, A or F the dispatch is on
|opcode|0|mod1|mod2| to C(DBR_0).

52

If the opcode is 7, A or F the dispatch is on
|opcode|0000000| to C(DBR_0).

If the opcode is 6, the dispatch is on |opcode|000|bits(11-8)| to C(DBR_0).

DD1
The DD1 dispatch is from the next byte in Channel 0. It dispatches on bits 7-4 and 2-0 to C(DBR_1).

```
7  4 3 2  0
| **** | *** |
```

RI0, RI1, RI2 and ADSP are unchanged.
MIPS
The Mips processor has three basic instruction formats:

R-type (register) [opcode=0]

```
31  26 25  21 20  16 15  11 10   6 5    0
| op  | rs  | rt  | rd  | sh  | func |
``` decode    loc  = DBR0 + 256 + func << 2
          RI0  = rd
          RI1  = rs
          RI2  = rt
          LIT  = sh J-type (jump) [opcodes 2, 3]

```
31  26 25                               0
| op  |              target            |
``` decode:   loc  = DBR0 + op<< 2
          lit  = CAR_0 bits (31–28) | target << 2
I-type (immediate) [opcodes ~= 0, 2, 3]

```
31  26 25  21 20  16 15                 0
| op  | rs  | rt  |      immediate       |
``` decode:   loc  = DBR0 + op << 2, if opcode ~= 1
               = DBR0 = 512 + rt << 2, if opcode = 1
          RI0  = rt
          RI1  = rs
          RI2  = bits (15–11)
          LIT  =
               imm se, if opcode = 8–b | 20–3f |
                  1 & rt = 8–f
               imm zf, if opcode = c–e
               imm << 16, if opcode = f
               imm se << 2, if opcode = 4–7 | 14–17 |
                  1 & rt = 0–3 | 10–13
               bits(25–0), if opcode = 10–13 cf

```
15  10 9 7 6 4   1 0 15                0
| OP  | A |SOP| B | I|    literal      |
```

RI0   = A
          RI1   = A
          RI2   = B
          IMMR  = literal
dispatch to:

```
15         11    6 5 3 2    0
| 0| DBR  | OP  |SOP| I| 00 |
``` if    <= OP <=
      increment ISP by 4, else 2.

Although the present invention has been described in detail with reference only to the presently-preferred embodiments, those of ordinary skill in the art will appreciate that various modifications can be made without departing from the invention. Accordingly, the invention is defined by the following claims.

I claim:
1. A method for emulating the instruction set of a target computer on a RISC architecture computer, comprising the steps of:

1) fetching a target instruction of a format compatible with the instruction set of the target computer;

2) parsing and decoding said instruction into fields designating an opcode and operands;

3) converting said opcode into an address pointing to a sequence of one or more microcoded instructions;

4) decoding said microcoded instruction into a LHS instruction having fields essentially compatible with a RISC architecture and a RHS instruction having fields to select a plurality of indirect registers pointing to emulated registers;

5) processing said emulated registers with an arithmetic logic unit;

6) calculating a condition code as a function of the operation of said arithmetic logic unit and a selection field within said microcoded instruction;

7) storing a result of said processing by said arithmetic logic unit;

8) storing a result of said condition code calculation; and 9) repeating steps 4–8 with a next microcoded instruction until an end of said microcoded sequence is encountered and then continuing at step 1 with a next target instruction.

2. A method for emulating the instruction set of a target computer on a RISC architecture computer as in claim 1, wherein step 9 additionally comprises detection of single instruction microcode sequence and directly continuing at step 1.

3. The method of claim 2, wherein steps 1–9 occur during a time period comprised of a plurality of clock cycles and step 1 is executed for a next target instruction during each clock cycle.

4. A RISC architecture computer having a native instruction width of N bits configured for emulating target instructions from the instruction set of a target computer, comprising:

a plurality of emulation registers capable of corresponding to registers in the target computer and having data widths greater than or equal to the data widths of the registers in the target computer;

a plurality of indirect registers for selection of said emulation registers;

parsing means to extract a plurality of data fields from a target instruction, at least one said field including an opcode;

dispatching means using said opcode to direct the RISC architecture computer to select at least one M+N bit expanded RISC instruction from a microcode memory;

an expanded instruction decoder for using said M bits from each said expanded RISC instruction to redefine the RISC architecture computer in terms of the target computer, wherein said M bits define fields, said fields comprising a width field for designating the data width of said emulation registers and the data width of an arithmetic function, an indirect register field for designating said indirect registers, and a condition code field for designating a condition code emulation mode; and condition code calculation means for determining the condition code for an arithmetic function according to said condition code field.

5. The computer of claim 4, wherein said RISC architecture computer and said microcode memory are contained within a single chip and said microcode memory is in ROM.

6. The computer of claim 4, wherein said RISC architecture computer is contained within a single chip and said microcode memory is external to said single chip.

7. The computer of claim 6, wherein said external microcode memory is in RAM.

8. The computer of claim 6, wherein said external microcode memory is in ROM.

9. The computer of claim 4, wherein said target computer is the Intel 80X86.

10. The computer of claim 4, wherein said target computer is the Motorola 680X0.

11. The computer of claim 4, wherein said target computer is the MIPS R3000.

12. The computer of claim 4, additionally comprising means to execute native RISC instructions.

13. The computer of claim 4, wherein said instruction set is comprised of binary combinations of data bits from the instruction set of the target computer, said computer additionally comprising means to execute a sequence of microcoded instructions in response to encountering at least one binary combination of data bits not otherwise within the instruction set of the target computer.

14. A RISC architecture computer having a native instruction width of N bits configured for emulating target instructions from the instruction set of a target computer, comprising:

a plurality of emulation registers capable of corresponding to registers in the target computer and having data widths greater than or equal to the data widths of the registers in the target computer;

a plurality of indirect registers for selection of said emulation registers;

parsing means to extract a plurality of data fields from a target instruction, at least one said field including an opcode;

dispatching means using said opcode to direct the RISC architecture computer to select at least one M+N bit expanded RISC instruction from a microcode memory;

an expanded instruction decoder for using said M bits from each said expanded RISC instruction to redefine the RISC architecture computer in terms of the target computer; and condition code calculation means for determining the condition code for an arithmetic function in accordance with the target computer.

15. The computer of claim 14, wherein said redefining means comprises using said M bits to define fields, said fields comprising a width field for designating the data width of said emulation registers and the data width of an arithmetic function, and an indirect register field for designating said indirect registers.

16. The computer of claim 14, wherein said expanded instruction decoder uses a condition code field within said M bits for designating a condition code emulation mode; and said condition code calculation means is comprised of a plurality of condition code calculators corresponding to a plurality of target computers wherein said condition code field enables one of said plurality of condition code calculators.

17. The computer of claim 14, wherein said RISC architecture computer and said microcode memory are contained within a single chip and said microcode memory is in ROM.

18. The computer of claim 14, wherein said RISC architecture computer is contained within a single chip and said microcode memory is external to said single chip.

19. The computer of claim 18, wherein said external microcode memory is in RAM.

20. The computer of claim 18, wherein said external microcode memory is in ROM.

21. The computer of claim 14, wherein said target computer is the Intel 80X86.

22. The computer of claim 14, wherein said target computer is the Motorola 680X0.

23. The computer of claim 14, wherein said target computer is the MIPS R3000.

24. The computer of claim 14, additionally comprising means to execute native RISC instructions.

25. The computer of claim 14, wherein said instruction set is comprised of binary combinations of data bits from the instruction set of the target computer, said computer additionally comprising means to execute a sequence of microcoded instructions in response to encountering at least one binary combination of data bits not otherwise within the instruction set of the target computer.

* * * * *